US010083248B2

(12) United States Patent
Broman et al.

(10) Patent No.: US 10,083,248 B2
(45) Date of Patent: Sep. 25, 2018

(54) METHOD AND SYSTEM FOR TOPIC-BASED BROWSING

(75) Inventors: Paul Broman, Mableton, GA (US); Jon Sweet, San Jose, CA (US); Tim Rechin, San Carlos, CA (US); Jessi Dong, Los Gatos, CA (US); John Greene, Portland, OR (US); Frank Yoo, San Francisco, CA (US)

(73) Assignee: EXCALIBUR IP, LLC, New York, NY (US)

( * ) Notice: Subject to any disclaimer, the term of this patent is extended or adjusted under 35 U.S.C. 154(b) by 494 days.

(21) Appl. No.: 12/755,913

(22) Filed: Apr. 7, 2010

(65) Prior Publication Data
US 2011/0252060 A1 Oct. 13, 2011

(51) Int. Cl.
*G06F 17/30* (2006.01)
(52) U.S. Cl.
CPC .. *G06F 17/30899* (2013.01); *G06F 17/30696* (2013.01); *G06F 17/30864* (2013.01)
(58) Field of Classification Search
None
See application file for complete search history.

(56) References Cited

U.S. PATENT DOCUMENTS

| | | | |
|---|---|---|---|
| 6,366,956 B1 | 4/2002 | Krishnan | |
| 7,836,009 B2 | 11/2010 | Paczkowski et al. | |
| 7,996,462 B2 * | 8/2011 | Degenhardt et al. | 709/204 |
| 8,005,825 B1 | 8/2011 | Ghosh | |
| 8,135,617 B1 * | 3/2012 | Agostino | G06Q 30/0241 705/1.1 |
| 2002/0129014 A1 | 9/2002 | Kim et al. | |
| 2002/0161747 A1 | 10/2002 | Li | |
| 2003/0023624 A1 * | 1/2003 | Hamilton, II | G06F 17/30867 715/234 |
| 2004/0003351 A1 | 1/2004 | Sommerer et al. | |
| 2004/0059708 A1 | 3/2004 | Dean et al. | |
| 2004/0205514 A1 | 10/2004 | Sommerer et al. | |
| 2004/0243645 A1 | 12/2004 | Broder et al. | |

(Continued)

FOREIGN PATENT DOCUMENTS

| | | |
|---|---|---|
| JP | 2009-265833 | 12/2009 |
| KR | 10-2006-0108248 | 10/2006 |
| KR | 10-2008-0111822 | 12/2008 |

OTHER PUBLICATIONS

Official Action issued in connection with U.S. Appl. No. 12/755,757 dated Oct. 1, 2012.

(Continued)

*Primary Examiner* — Rehana Perveen
*Assistant Examiner* — Raheem Hoffler
(74) *Attorney, Agent, or Firm* — James J. DeCarlo; Greenberg Traurig, LLP

(57) ABSTRACT

Disclosed is a method and system for navigating, by a browser executing on the computing device, to a web page; transmitting by a client-side module executing on the computing device to a server computer over a network a request to the server computer for topics associated with the web page; receiving, by the computing device, a set of (one or more) topics associated with the web page from the server computer; displaying by the browser in a first content area the web page; and displaying by the browser in a second content area the received set of topics associated with the web page.

10 Claims, 33 Drawing Sheets

(56) References Cited

U.S. PATENT DOCUMENTS

| | | |
|---|---|---|
| 2005/0058362 A1 | 3/2005 | Kita |
| 2005/0086612 A1* | 4/2005 | Gettman ............. G06F 3/04815 |
| | | 715/848 |
| 2005/0197992 A1 | 9/2005 | Kipersztok et al. |
| 2005/0289452 A1 | 12/2005 | Kashi et al. |
| 2006/0004799 A1* | 1/2006 | Wallender ......... G06F 17/30884 |
| 2006/0036966 A1 | 2/2006 | Yevdayev |
| 2006/0064411 A1 | 3/2006 | Gross et al. |
| 2006/0149775 A1 | 7/2006 | Egnor |
| 2006/0184348 A1 | 8/2006 | Schattka et al. |
| 2006/0224587 A1 | 10/2006 | Zamir et al. |
| 2008/0010268 A1 | 1/2008 | Liao et al. |
| 2008/0065737 A1 | 3/2008 | Burke et al. |
| 2008/0320021 A1* | 12/2008 | Chan et al. .................... 707/101 |
| 2008/0320415 A1* | 12/2008 | Ostergaard ........ G06F 17/30058 |
| | | 715/810 |
| 2009/0228442 A1* | 9/2009 | Adams et al. .................... 707/3 |
| 2009/0228774 A1* | 9/2009 | Matheny ........... G06F 17/30873 |
| | | 715/201 |
| 2009/0249229 A1 | 10/2009 | Offer |
| 2010/0107088 A1* | 4/2010 | Hunt et al. ..................... 715/752 |
| 2010/0287175 A1* | 11/2010 | Beaudreau ........ G06F 17/30657 |
| | | 707/759 |
| 2010/0312771 A1* | 12/2010 | Richardson ....... G06F 17/30899 |
| | | 707/749 |
| 2011/0119248 A1* | 5/2011 | Abe et al. ...................... 707/710 |
| 2011/0179020 A1* | 7/2011 | Ozzie et al. ................... 707/723 |
| 2011/0208732 A1* | 8/2011 | Melton et al. ................ 707/728 |
| 2011/0252060 A1 | 10/2011 | Broman et al. |
| 2011/0252329 A1 | 10/2011 | Broman |

OTHER PUBLICATIONS

International Search Report and Written Opinion issued in PCT/US2011/031087 dated Nov. 25, 2011.

* cited by examiner

Topic Detail View - Server

Action(s) Suggestion

```
<concept name="Jaguar Cars" aboutness="1.9230769230769231"wight="0.5804843304843305"/>
  <category name="British brands"weight="1.9040181548776622"/>
  <category name="Car manufacturers"weight="1.8389340674406884"/>
  <category name="Tata Group"weight="1.1796241873607398"/>
  <category name="Covery motor companies"weight="1.1796241873607398"/>
  <category name="Motor vehicle manufacturers of the United Kingdom"weight="1.03618058"/>
  <category name="Electric vehicle manufacturers" weight="0.9187957536318161"/>
  <category name="Luxury motor vehicle manufacturers"weight="0.7577415839544139"/>
  <category name="Jaguar"weight="0.3628027065527065"/>
  <category name="Companies established in 1922"weight="0.3628027065527065"/>
  <category name="Plug-in hybrid vehicles"weight="0.3628027065527065"/>
<concept>
```
— 2705

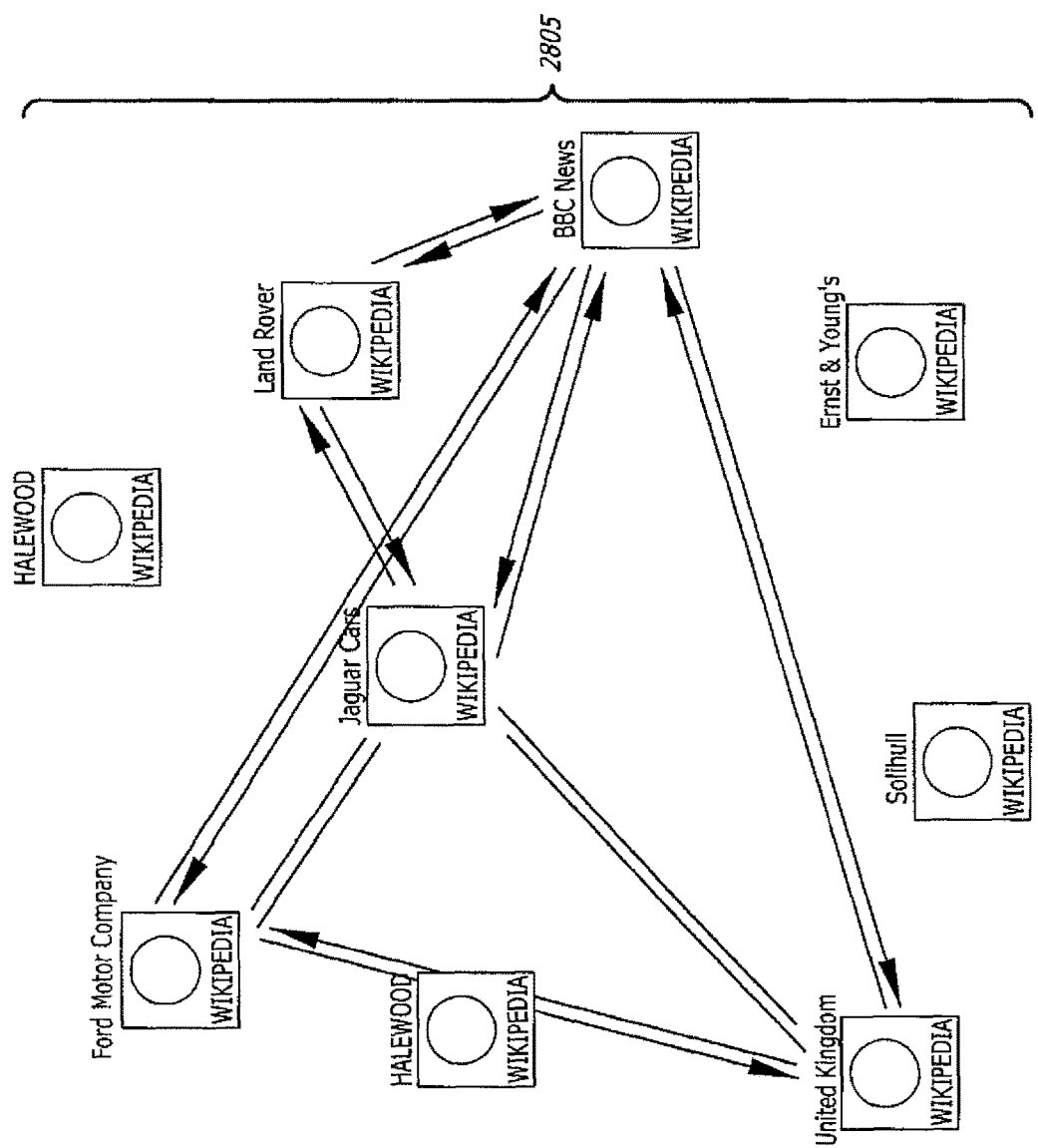

```
<concept name="BBC News" weight="0.8797708515915188" aboutness="0.3396739130434787" hm="0.2450584203632473B"></concept>
<concept name="Ford Motor Company" weight="0.7413240627721461" aboutness="0.8720930232255814" hm="0.400704534936038036"></concept>
<concept name="BBC" weight="0.7135279389B502" aboutness="0.3993610223642173" hm="0.2560500025793318"></>
<concept name="Rover Company" weight="0.6750121654501215" aboutness="1.908396946564B856" hm="0.498640013B669482"></concept>
<concept name="Land Rover" weight="0.6319022038427318" aboutness="1.22549019607B4315" hm="0.4169231B52797994"></concept>
<concept name="Jaguar Cars" weight="0.5B04B43304B43305" aboutness="1.9230769230769231" hm+"0.4458912353649195"></concept>
<concept name="Business" weight="0.5493574592375493" aboutness="0.0" hm="0.0"></concept>
<concept name="United Kingdom" weight="0.5372257337983145" aboutness="0.0607976653694980S" hm="0.054616709708B13306"></concept>
```

Explore topics

Jaguar Cars
Jaguar Cars Ltd., better known simply as Jaguar is a British luxury car manufacturer.... wikipedia >
Related Stories | Photos Rover Company
The Rover Company is a former British car manufacturing company founded as Starfe.... wikipedia >
Related Stories | Photos Ford Motor Company
The Ford Motor Company is an American multinational corporation and the world's... wikipedia >
Related Stories | Photos search for topics http://news.bbc.co.uk/2/hr/business/7313380.stm Search      Explore the BBC Page last updated at 14:38 GMT, Wednesday, 26 March 2008
E-mail this to a friend    Printable version

Tata buys Jaguar in £1.15bn deal

Car giant Ford has sold its luxury UK-based car brands Jaguar and Land Rover to Indian company Tata.

Tata, India's biggest vehicle maker, is paying $2.3 bn (£1.15bn) for the British brands after months of negotiations over price and supply relationships.

The negotiations started last June when Ford announced its intention to sell the companies as a package.

Jaguar and Land Rover employ about 16,000 staff at UK plants in the West Midlands and Merseyside.

Although Land Rover remains profitable, Ford has never managed to make money from its investment in Jaguar

*Ford put Jaguar and Land Rover up for sale last June*

METHOD AND SYSTEM FOR TOPIC-BASED BROWSING

FIELD

The present disclosure relates to web pages, and more specifically to a method and system for topic-based browsing.

BACKGROUND

The structure of the World Wide Web is based on web pages and domain names associated with those web pages. Each web page is identified by its Uniform Resource Locator (URL). When a user saves a bookmark, the user saves the URL associated with a web page to which the user may want to return. When a user signs up for a Really Simple Syndication (RSS) feed, the user obtains information from a single web page source. Further, each instance of a typical web browser is set up to display a single web page.

SUMMARY

Despite the structure of the web being based on individual web pages, the intent of a user of the web is often not based on a particular web page itself but rather based on concepts or topics of interest.

In one aspect, a method and computing device navigate, by a browser executing on the computing device, to a web page; transmit by a client-side module executing on the computing device to a server computer over a network, a request to the server computer for topics associated with the web page; receive, by the computing device, a set of (one or more) topics associated with the web page from the server computer; display, by the browser in a first content area, the web page; and display, by the browser in a second content area, the received set of topics associated with the web page.

In one embodiment, the computing device receives the client-side module from the server computer over the network. In one embodiment, the transmitting of a request to the server computer for topics associated with the web page includes transmitting a Uniform Resource Locator (URL) of the web page to the server computer and/or transmitting a copy of the content of the web page to the server computer.

In one embodiment, the receiving of topics includes receiving a set of topics and a set of categories, where each category is associated with a topic. Further, the second content area can be configured according to one of the categories.

A user of the computing device can select one of the received topics. In one embodiment, the computing device receives additional information associated with the selected received topics. In one embodiment, the server computer transmits an item (also referred to herein as an entity) associated with the selected topic. The entity can be text, a graphic, an icon, a video, a link, structured information, an article, a feed, etc. associated with the selected topic. The computing device receives the entity and can display the entity in the second content area. In one embodiment, the computing device receives advertiser content and/or associated actions associated with a topic. In one embodiment, the computing device receives information related to (e.g., from) another user known (e.g., can be a direction connection (e.g., friend in social graph) or an unknown user who shares the same topical interest) by the user of the browser, where the information received is related to the topic.

In another aspect, a method and system includes receiving, by a server computer over a network from a client-side module, a request for topics associated with a web page being displayed in a first content area of a browser executing on a computing device; and transmitting, by the server computer to the browser for display to a user in a second content area of the browser, a set of (one or more) topics associated with the web page.

In one embodiment, the receiving of a request for topics associated with a web page further includes receiving a Uniform Resource Locator (URL) of the web page by the server computer. In one embodiment, the transmitting of a set of topics includes transmitting a set of topics and categories. In one embodiment, a configuration for the second content area according to one of the categories is transmitted by the server computer to the computing device. In another embodiment, the configuration for the second content area is rendered by the client-side module.

In one embodiment, the transmitting of a set of topics further includes transmitting an entity associated with the transmitted set of topics to the computing device. In one embodiment, advertiser content and/or associated actions associated with a topic is transmitted. In one embodiment, information related to (e.g., from) another user known by a user of the browser is transmitted, where the information is associated with one or more of the transmitted set of topics.

In one aspect, a method and system includes receiving, by a server computer over a network from a client-side module, a request for topics associated with a search query that has been input into a search input area displayed by a browser executing on a computing device in a first content area of the browser; and transmitting, by the server computer to the browser for display in a second content area of the browser, topics associated with the search query. In one embodiment, each topic associated with the search query corresponds to a category. In one embodiment, a request is also made to fetch visited pages including bookmarks. This request could be a combination of recent cached data on the client and historical data stored on the server. In addition, in one embodiment a request/process would be made/run to scan the search results and look for results that match the user's top sites (sources). In essence this is a personalized search experience where topics, visited sites/bookmarks and personally relevant search results are fetched and displayed in the secondary content area.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views:

FIG. 27B is an example of an output window of the disambiguation example of FIG. 9A in accordance with an embodiment of the present disclosure;

FIG. 28A is a screen shot of a selection example in accordance with an embodiment of the present disclosure;

FIG. 28B is a flow diagram of topics ranked according to the selection example of FIG. 10A in accordance with an embodiment of the present disclosure;

FIG. 28C is an example of an output window of the selection example of FIG. 10A in accordance with an embodiment of the present disclosure;

FIG. 29 is a screen shot of a web document to which the user has navigated and a sidebar in accordance with an embodiment of the present disclosure.

DESCRIPTION OF EMBODIMENTS

Figure 1:
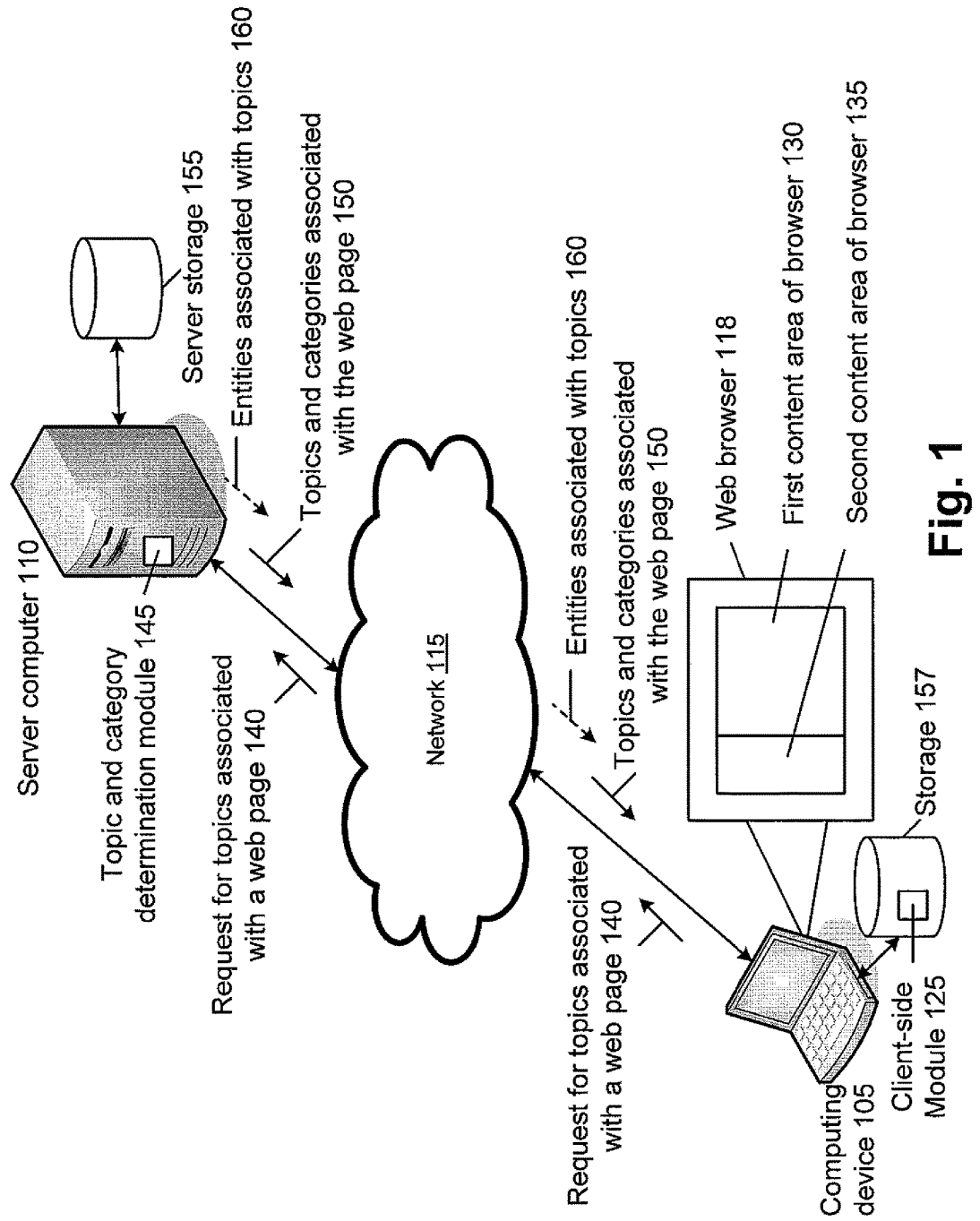
FIG. 1 is a block diagram of a client-side module of a computing device communicating with a server computer over a network in accordance with an embodiment of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Figure 2:
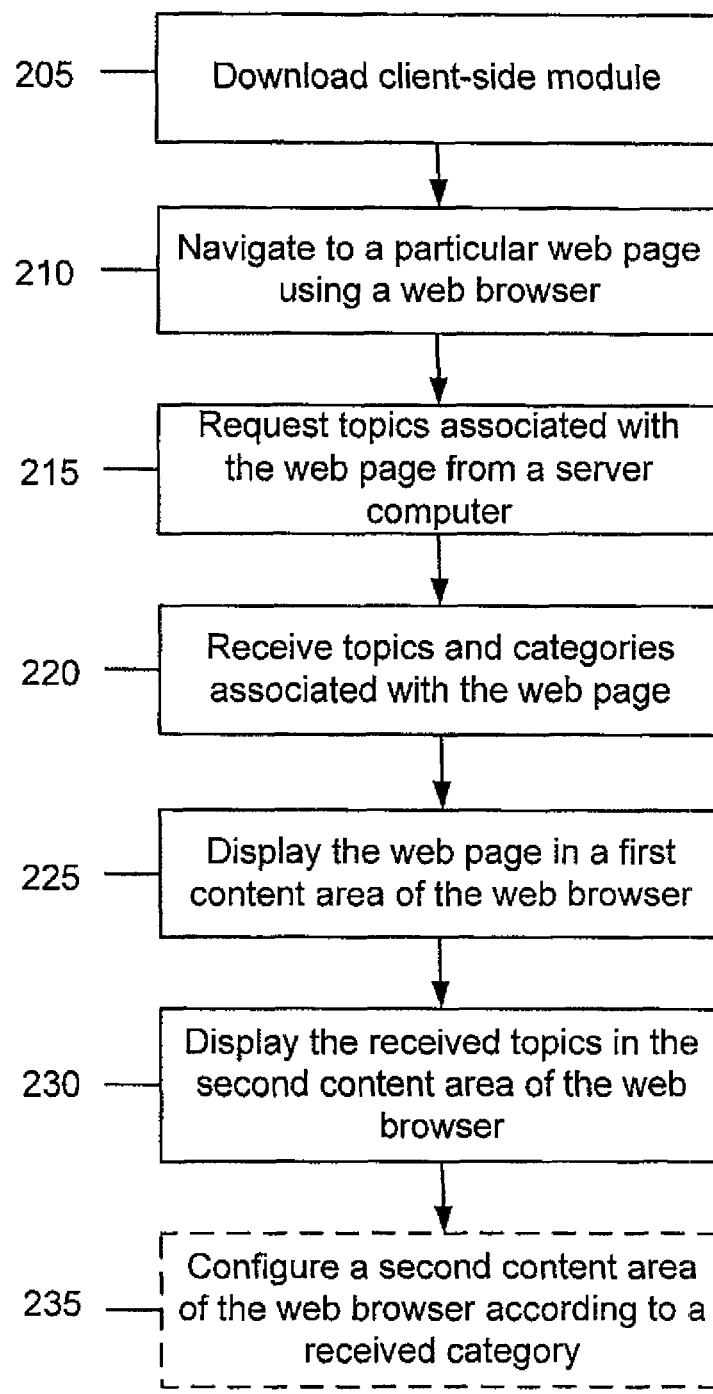
FIG. 2 is a flowchart illustrating steps performed by the computing device of FIG. 1 in accordance with an embodiment of the present disclosure.

FIG. 1 is a block diagram of an embodiment of a computing device 105 communicating with a server computer 110 over a network 115 such as the Internet. FIG. 2 is a flowchart illustrating an embodiment of the steps performed by the computing device 105 of FIG. 1. A user of the computing device 105 uses a web browser 118 executing on the computing device 105 to, for example, navigate to a web page (e.g., Yahoo!'s home page—www.yahoo.com) associated with a service provider (e.g., Yahoo! Inc. of Sunnyvale, Calif.). In one embodiment, the user logs into (or creates) a user account with the service provider. In one embodiment, the server computer 110 receives a request for the user to log into the account and, if the login information is correct, logs the user into the user account.

In one embodiment, the computing device 105 transmits a request to download a client-side module 125 from the server computer 110. The client-side module 125 can appear in any area of the browser (e.g., the left side of the browser 118, the right side of the browser 118, the top of the browser 118, and/or the bottom of the browser 118). In one embodiment, the client-side module 125 is a sidebar. In another embodiment, the client-side module 125 is a toolbar. In one embodiment, the client-side module 125 modifies content displayed with (e.g., below) a web page address bar. In one embodiment, the client-side module 125 is downloaded by the computing device 105 (step 205) and, once the client-side module 125 is downloaded, a graphical user interface (UI) associated with the client-side module 125 is displayed when the browser 118 navigates to a web page (associated with or not associated with the service provider). In one embodiment, the graphical UI is displayed if the user selects to have the UI displayed. In one embodiment, the client-side module 125 (e.g., sidebar or toolbar) can be web-based as the secondary content presentation framework is web-based. This means that it can be shared via a domain link and the recipient can get a sidebar/toolbar experience without requiring a download.

For example, after downloading the client-side module 125, the user may use the web browser 118 to navigate to a particular web page (step 210). In one embodiment, the web browser 118 displays the web page in a first content area 130 of the browser 118 and displays content associated with the client-side module 125 in a second content area 135 of the browser 118. The size of the first content area 130 can be larger than or smaller than the size of the second content area 135. In one embodiment, the size of either or both content areas is adjustable by the user. In one embodiment, the client-side module 125 is accessed by the browser when a user of the computing device 105 enters a particular web page domain name.

In one embodiment, the computing device 105 transmits a request 140 for topics associated with the web page to which the browser 118 has navigated (step 215). The request 140 for topics can be transmitting a URL of the web page to which the computing device 105 has navigated. The request 140 for topics can also be transmitting a copy of the content of the web page to which the user has navigated to the server computer 110.

In one embodiment, the server computer 110 includes a topic and category determination module 145. In one embodiment, the topic and category module 145 has previously analyzed the web page to which the user has navigated and has stored the results of its analysis in server storage 155 (e.g., a database). The server computer 110 (topic and category module 145) can then use this previous analysis to quickly determine one or more topics associated with the web page. Alternatively, the topic and category module 145 analyzes the web page to determine a set of topics associated with the web page after receiving the request 140. A set of topics associated with a web page is defined herein as one or more topics associated with the web page. A topic may be part of or not part of the web page's title, URL, graphics, etc. and is typically determined by analyzing at least a portion of the text of the web page.

In one embodiment, the topic and category module 145 also determines from data stored in server storage 155 or from an analysis of the web page a set of categories associated with the web page. A category compared to a topic is a higher level of abstraction. For example, if a web page is discussing a Nikon digital camera, the topic of the web page can be digital cameras while the category of the web page can be purchasable products. A set of categories associated with a web page is defined herein as one or more categories associated with the web page.

The server computer 110 transmits the set of topics and the set of categories 150 associated with the web page to the computing device 105. In one embodiment, the set of topics and categories 150 have been ordered or ranked in accordance with their relevance to the web page itself. For example, a set of topics associated with a web page about Nikon digital cameras can be listed as 1. Digital cameras
2. Cameras
3. Photography In one embodiment, a set of categories associated with the web page about Nikon digital cameras can be listed as:

1. Purchasable products
2. Consumer goods

In one embodiment, the server computer 110 (e.g., the topic and category module 145) transmits the entire set of topics and the entire set of categories 150 to the computing device 105. In another embodiment, the server 110 transmits a predetermined number of the determined topics and categories (e.g., the first topic and the first category in each set). The computing device 105 receives the topics and categories 150 (step 220). In one embodiment, the computing device 105 stores the topics and categories 150 in a storage 157 (e.g., a memory or database). The computing device 105 displays the web page in the first content area 130 of the web browser 118 (step 225) and displays one or more of the topics and/or categories in the second content area 135 of the web browser 118 (step 230). In one embodiment, the computing device 105 configures the second content area 135 of the web browser 118 according to a received category (step 235). For example, if a category associated with a web page is "Sports", in one embodiment the computing device 105 displays sports-related advertisements in the second content area 135 in addition to the received topics. As another example, the computing device 105 can display sports-related graphics in the second content area 135 in addition to the received topics. Further, in one embodiment different user interfaces are shown based on categories of specific topics.

Figure 3:
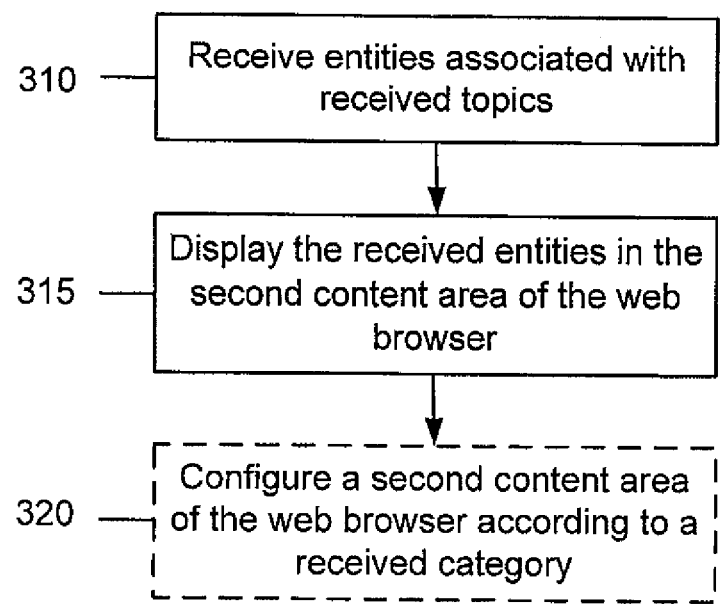
FIG. 3 is a flowchart illustrating steps performed by the computing device of FIG. 1 in accordance with an embodiment of the present disclosure.

FIG. 3 is a flowchart illustrating an embodiment of steps performed by the computing device 105. In one embodiment, the server computer 110 transmits one or more entities 160 associated with the topics to the computing device 105. As used herein, an entity is text, a graphic, an icon, a video, a link, structured information, an article, a feed, etc. associated with a topic determined from a web page. In one embodiment, the computing device 105 receives the entities (step 310) and displays the entity or entities 160 in the second content area 135 of the browser 118 (e.g., while the user is viewing the web page in the first content area 130 of the browser 118) (step 315). In one embodiment, the computing device 105 configures the second content area 135 according to a received category (which was received with a topic or was received with an entity) (step 320).

For purposes of this disclosure (and as described in more detail below with respect to FIG. 20), a computer or computing device such as the computing device 105 and/or server 110 includes a processor and memory for storing and executing program code, data and software which may also be tangibly stored or read from any type or variety of well known computer readable storage media such as magnetic or optical discs or RAM-discs or tape, by way of non-limiting example. Computers can be provided with operating systems that allow the execution of software applications in order to manipulate data. Personal computers, personal digital assistants (PDAs), wireless devices, cellular telephones, interne appliances, media players, home theater systems, servers, and media centers are several non-limiting examples of computing devices. The computing device 105 and the server 110 can, in one embodiment, also include a display, such as a screen or monitor. Further, the server and/or computing device may include one or more computers.

An embodiment of pseudocode executed by the computing device 105 for detecting topics is:

```
Begin
    Client-side module is informed of new web page load by browser
    Client-side module receives a set of topics from server computer
    If server computer did not return error code
        Add returned topics to topic history database (described in
            greater detail below with respect to Fig. 14)
        If sidebar is open
            Display topic notification in client-side module user
                interface
        Else
            Display topic count on sidebar
        End if
    End if
End
```

An embodiment of pseudocode executed by the server computer 110 for detecting topics is:

```
Begin
    If URL is in cache
        Get topics from URL entry in cache
    Else
        Get topics from entity detection system
        Add resulting topics to cache
    End if
    If URL is "bad" (unscannable, adult, spam)
        Return error code
    Else
        If topics were found
            Return topics
        Else
            Return empty set
        End if
    End if
End
```

In one embodiment, the server computer 110 receives a request for topics associated with a search query that has been input into a search input area displayed by the browser 118 in the first content area 130. The server computer 110 transmits to the browser 118 for display in the second content area 135 of the browser 118 topics associated with the search query. In one embodiment, each topic associated with the search query corresponds to a category.

Figure 4:
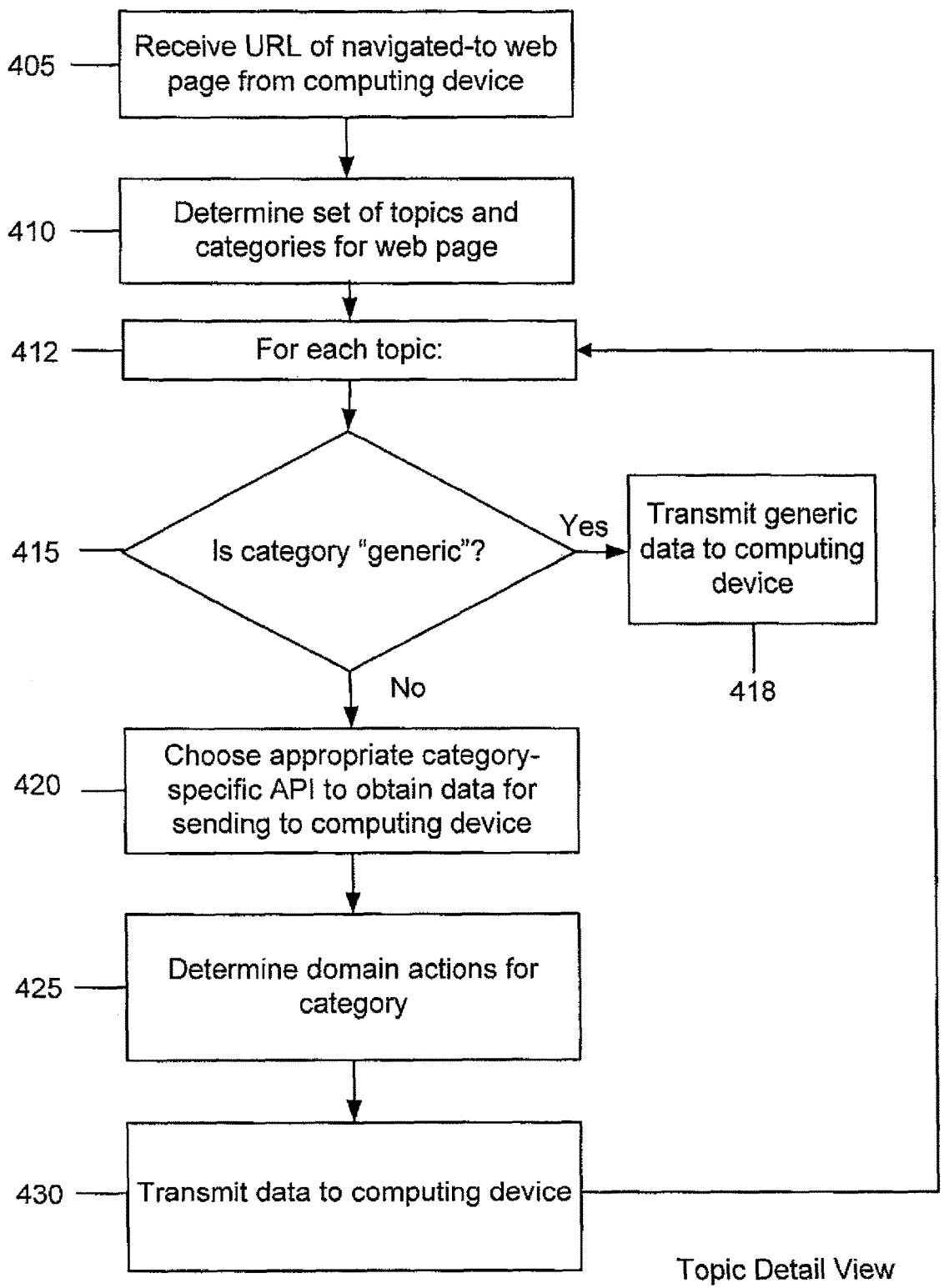
FIG. 4 is a flowchart of steps performed by the server computer of FIG. 1 in accordance with an embodiment of the present disclosure.
Figure 5:
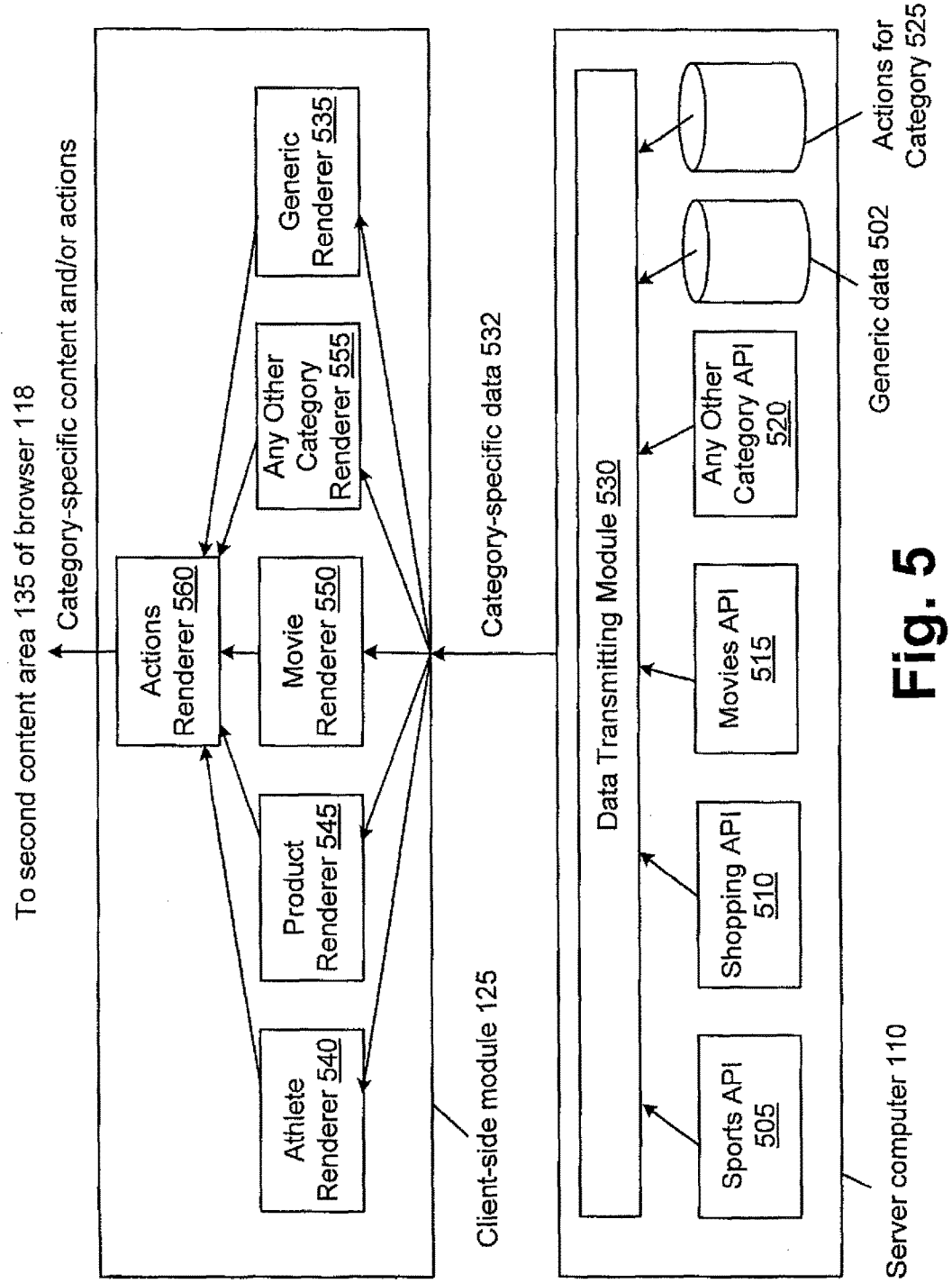
FIG. 5 is a block diagram of modules and application programming interfaces (APIs) executing on the server computer of FIG. 1 and the computing device of FIG. 1 in accordance with an embodiment of the present disclosure.

FIG. 4 is a flowchart of an embodiment of steps performed by the server computer 110. FIG. 5 is a block diagram of an embodiment of modules and application programming interfaces (APIs) executing on the server computer 110 and the client-side module 125. In one embodiment, the server computer 110 receives a URL of a web page to which the computing device 105 has navigated (step 405). The server computer 110 determines a set of topics and a set of categories for the web page (step 410). The server computer 110 then determines, for each topic (step 412), if each category determined in step 410 is generic (i.e., is not one of a predetermined set of categories stored by the server computer 110) (step 415). As described in more detail below with respect to FIG. 7, if a category is generic, the server computer 110 transmits generic data (e.g., retrieved from a database 502 storing one or more knowledge collection website data file(s) (e.g., Wikipedia® data file(s))) to the computing device 105 (step 418).

If the category is not generic, the server computer 110 chooses appropriate category-specific application programming interfaces (APIs) to use to obtain data for sending to the computing device 105 (step 420). The server computer 110 can include separate APIs for different categories. For example, the server computer 110 can include a sports API 505, a shopping API 510, a movies API 515, and an "any other category API" 520 representing an API for any other category. In one embodiment, the server computer 110 uses a specific API 505, 510, 515, 520 to acquire data that will be part of a transmitted entity 160 associated with the web page. In one embodiment and as described in more detail below, the server computer 110 determines domain actions for a particular category (step 425). The server computer 110 can retrieve domain actions associated with a category from an actions database 525. The server computer 110 then uses a data transmitting module 530 to transmit category-specific data 532 (e.g., an entity and/or an action item associated with the category) to the computing device 105 (step 430).

Figure 6:
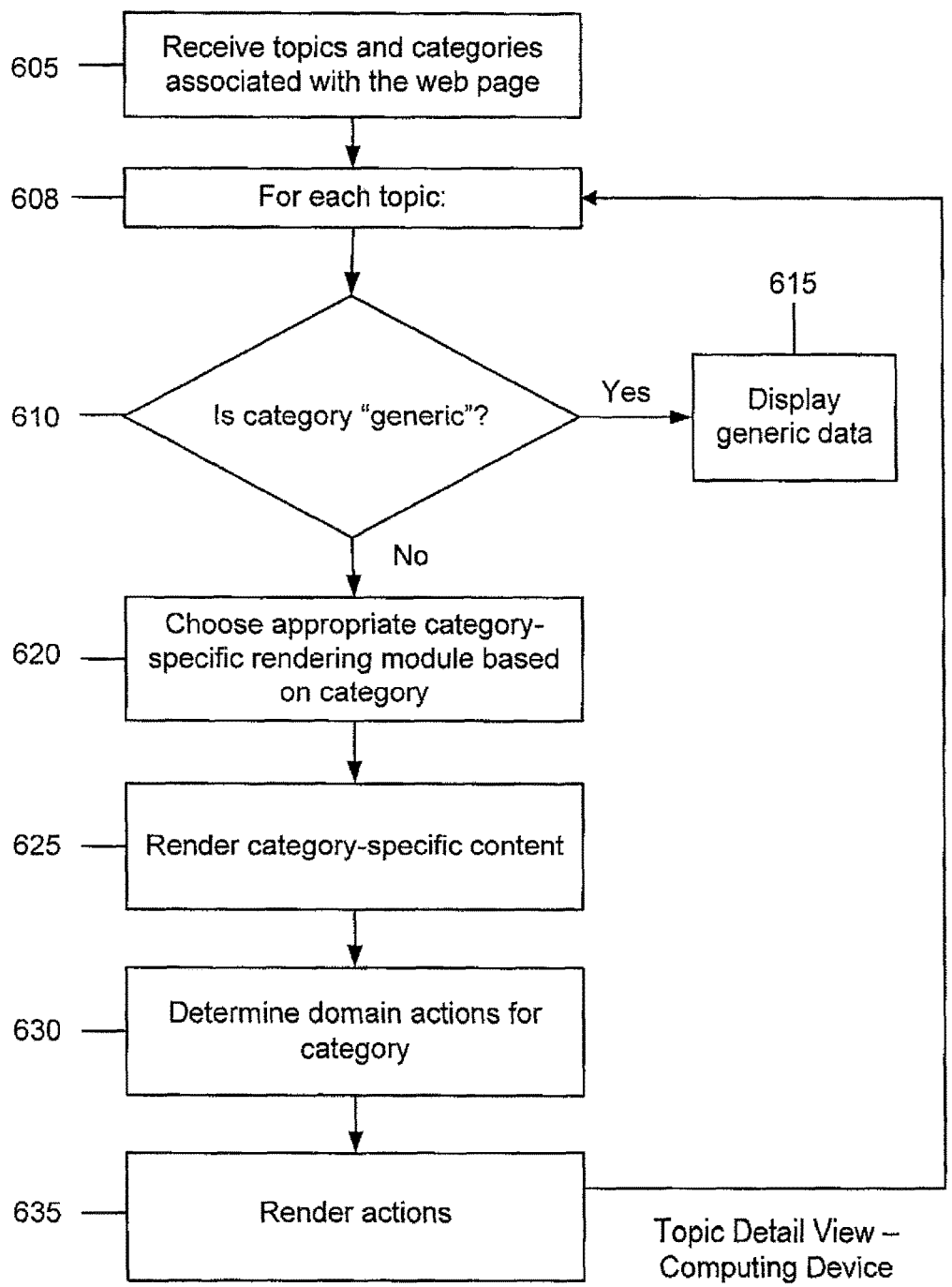
FIG. 6 is a flowchart of steps performed by the computing device of FIG. 1 to provide a topic detail view in accordance with an embodiment of the present disclosure.

FIG. 6 is a flowchart of an embodiment of steps performed by the computing device 105 to provide a topic detail view. The computing device 105 receives one or more topics and categories associated with the web page from the server computer 110 (step 605). In one embodiment, the computing device 105 determines, for each topic (step 608), if a category is generic in step 610. If a category is generic, the computing device 105 displays generic data (step 615) in the second content area 135 of the web browser 118 using a generic renderer 535. If a category is not generic, the computing device 105 chooses an appropriate category-specific rendering module based on the category (step 620). For example, the computing device 105 may include an athlete renderer 540 (e.g., for a sports category), a product renderer 545 (e.g., for a shopping category), a movie renderer 550 (e.g., for a movie category), and an any other category renderer 555 (e.g., for another category). The category-specific renderer 540, 545, 550, 555 renders the category-specific content (step 625) in the second content area 135 of the browser 118. One or more of these renderers may be provided by the service provider or may be provided by one or more third parties.

In one embodiment and as described in more detail below with respect to FIG. 15, the computing device 105 determines one or more domain actions for the category (step 630). The computing device 105 renders the actions with an actions renderer 560 (step 635). An action associated with a category can include, for example, a link to Blockbuster's web page that enables a user to rent a movie online if the category is Movies. In a further embodiment, an action may include filling in Blockbuster's web form on the web page enabling a user to rent a movie online. These actions may be rendered by, for example, a user selecting a link, a user selecting a checkbox, etc.

An embodiment of pseudocode executed by the computing device 105 for displaying topics in a detailed view is:

```
Begin
    Pull topic data from server computer
    If topic category not "generic"
        Create tab set (for 'at a glance' and 'news')
    End if
    Switch (based on category)
        Case Generic - use generic renderer
        Case Athlete - use athlete renderer
```

-continued

```
            Case Product - use product renderer
            Case Movie - use movie renderer
            ...
            Case Any Other Category - use any other category renderer
        End Switch
        Render context-specific content using selected renderer
        Find specific actions based on category
        Loop over each action
            If action domain not in domain-based history
                Remove action
            Else
                Increment action weight based on number of visits
            End if
        End Loop
        Sort 3rd party actions based on action weight
        Render 3rd party actions
End
```

An embodiment of pseudocode executed by the server computer 110 for displaying topics in a detailed view is:

```
Begin
    If data for this topic is in the cache
        Return this data
    Else
        If topic category is 'generic'
            Get generic data from local Wikipedia data dump
        Else
            Switch (based on category)
                Case Athlete - use Sports API
                Case Product - use Shopping API
                Case Movie - use Movies API
                ...
                Case Any Other Category - use Any Other Category
                API
            End Switch
            Ping selected API to acquire data
            If data fetch was successful
                Add data to topic cache
                Return this data
            Else
                Return error
            End if
        End if
    End If
End
```

Figure 7:
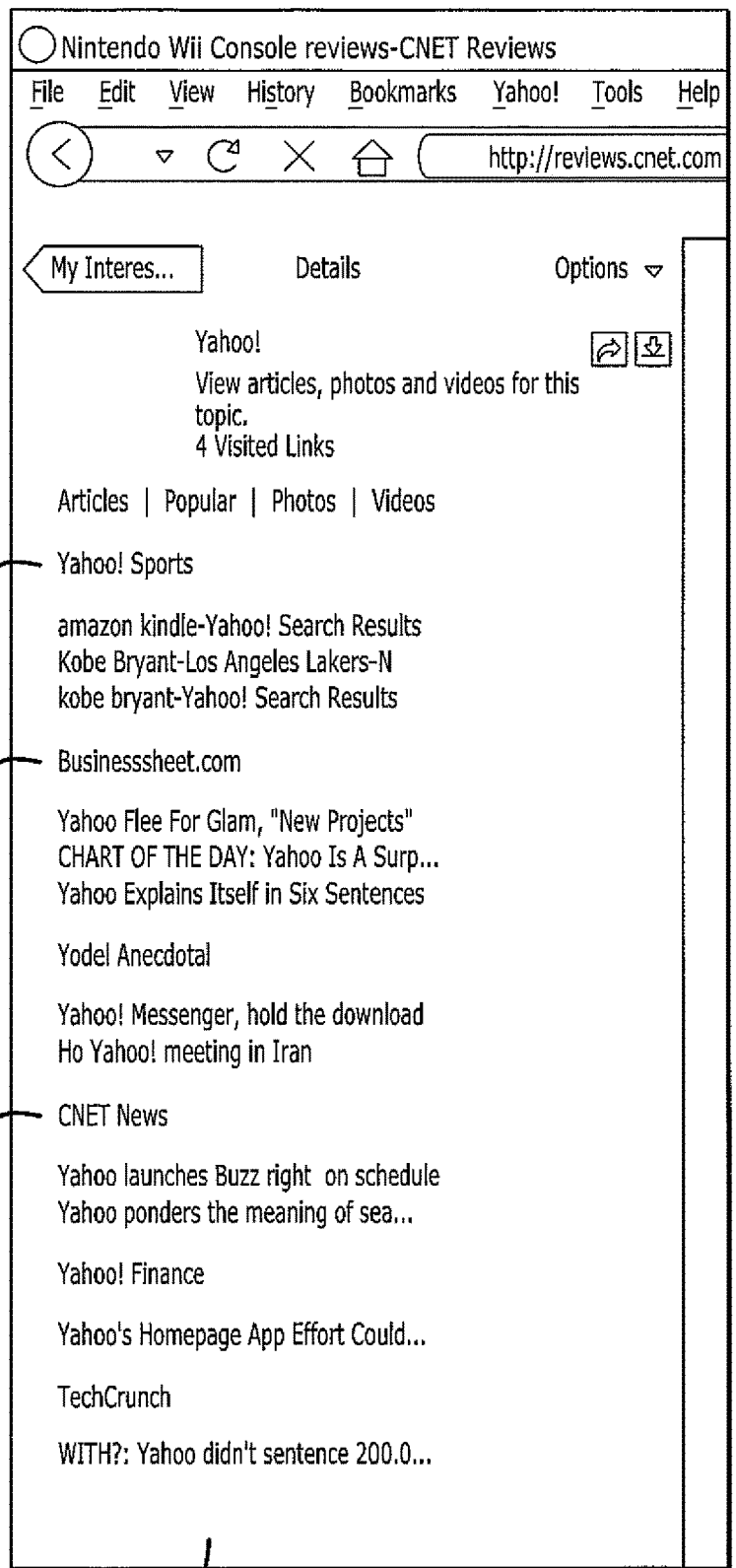
FIG. 7 is a screen shot of a sidebar being displayed in a second content area of a browser in accordance with an embodiment of the present disclosure.

FIG. 7 is a screen shot of a sidebar 705 being displayed in the second content area 135 of the browser 118. Sidebar 705 is a generic view shown when the topic can't be categorized into a specific predetermined category (see above, FIG. 4, step 418 and FIG. 6, step 615). The generic view of sidebar 705 includes generic information, such as a link 710 to sports information, a link 715 to a business page, and a link 720 to news.

Figure 8:
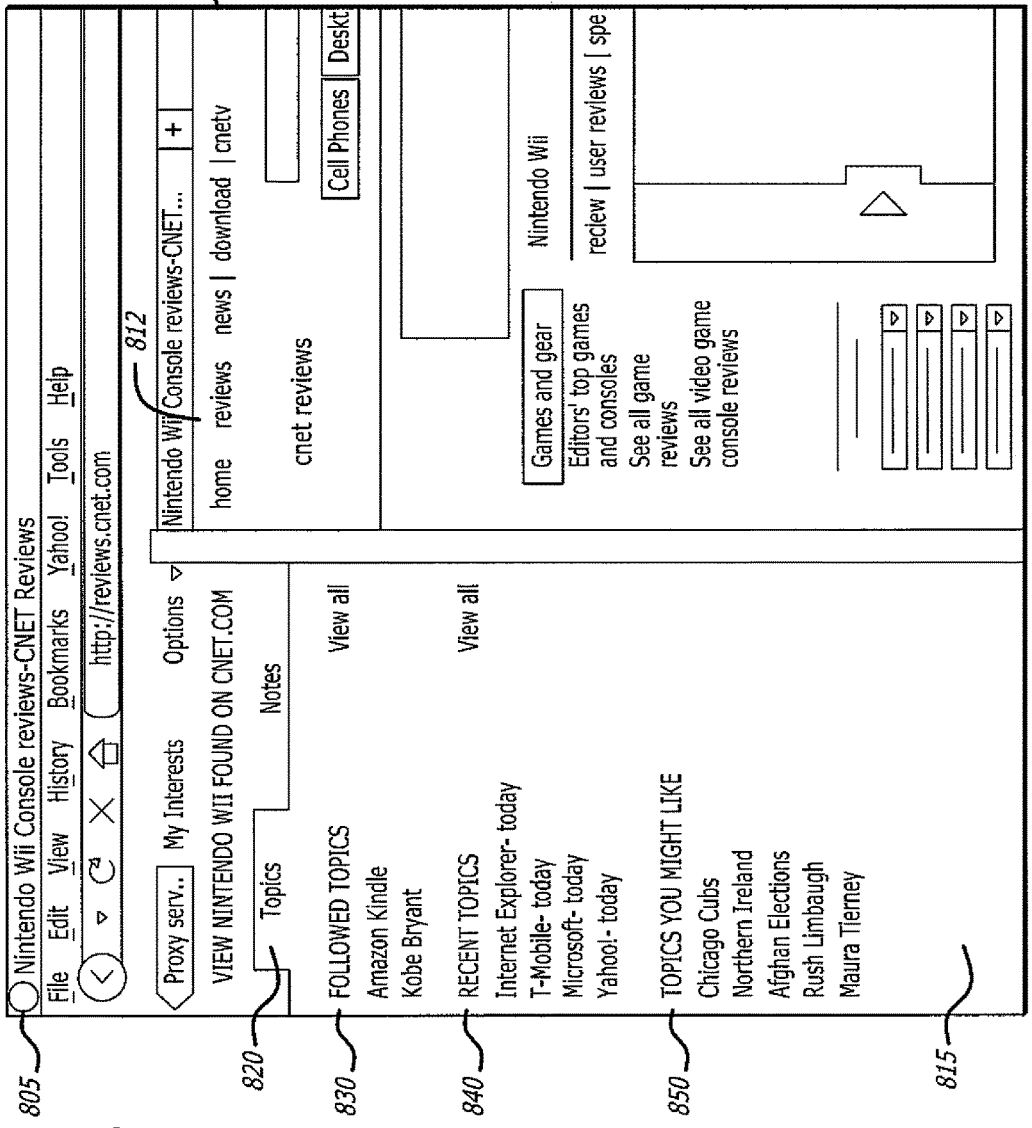
FIG. 8 is a screen shot of a browser displaying a first content area when the computing device has navigated to a web page about a review of the Nintendo Wii® console and a second content area showing topic information in accordance with an embodiment of the present disclosure.

FIG. 8 is a screen shot of a browser 805 displaying a first content area 810 when the computing device 105 has navigated to a web page 812 and a second content area 815 showing topic information. In one embodiment, the second content area 815 includes a Topics tab 820 that enables a user to view topic information. In one embodiment, the Topics tab, when selected by a user, shows saved or previously followed topics 830. As described in more detail below, this is referred to as the user's topic history and refers to topics that the user has saved (e.g., locally on the computing device 105 or on storage 157 associated with the computing device 105).

In one embodiment, the Topics tab 820 also includes a Recent Topics section 840. The Recent Topics section 840 includes topics recently viewed (i.e., a topic recently selected by the user of the computing device 105 after the user was notified of the topic). In one embodiment, the topics listed in the Recent Topics section 840 also shows the day or date that the user viewed the topic. In one embodiment, the Topics tab 820 also includes topic suggestions 850, which are topics that are currently popular (e.g., often searched via one or more search engines). In one embodiment, when a user selects one of the topics displayed in the Topics tab 820, the user is brought to a detailed view. In one embodiment (and as shown in FIG. 8), web page 812 is a web page about a review of the Nintendo Wii® console.

In FIG. 8, the secondary content is not associated with the current web page. The My Interests user interface is a user dashboard that displays topics that a user is following, recent topics they have viewed, and suggested topics. In one embodiment, a user accesses this user interface via a global button in the secondary content area (and possibly from the browser chrome) at any time during the browsing session.

Figure 9:
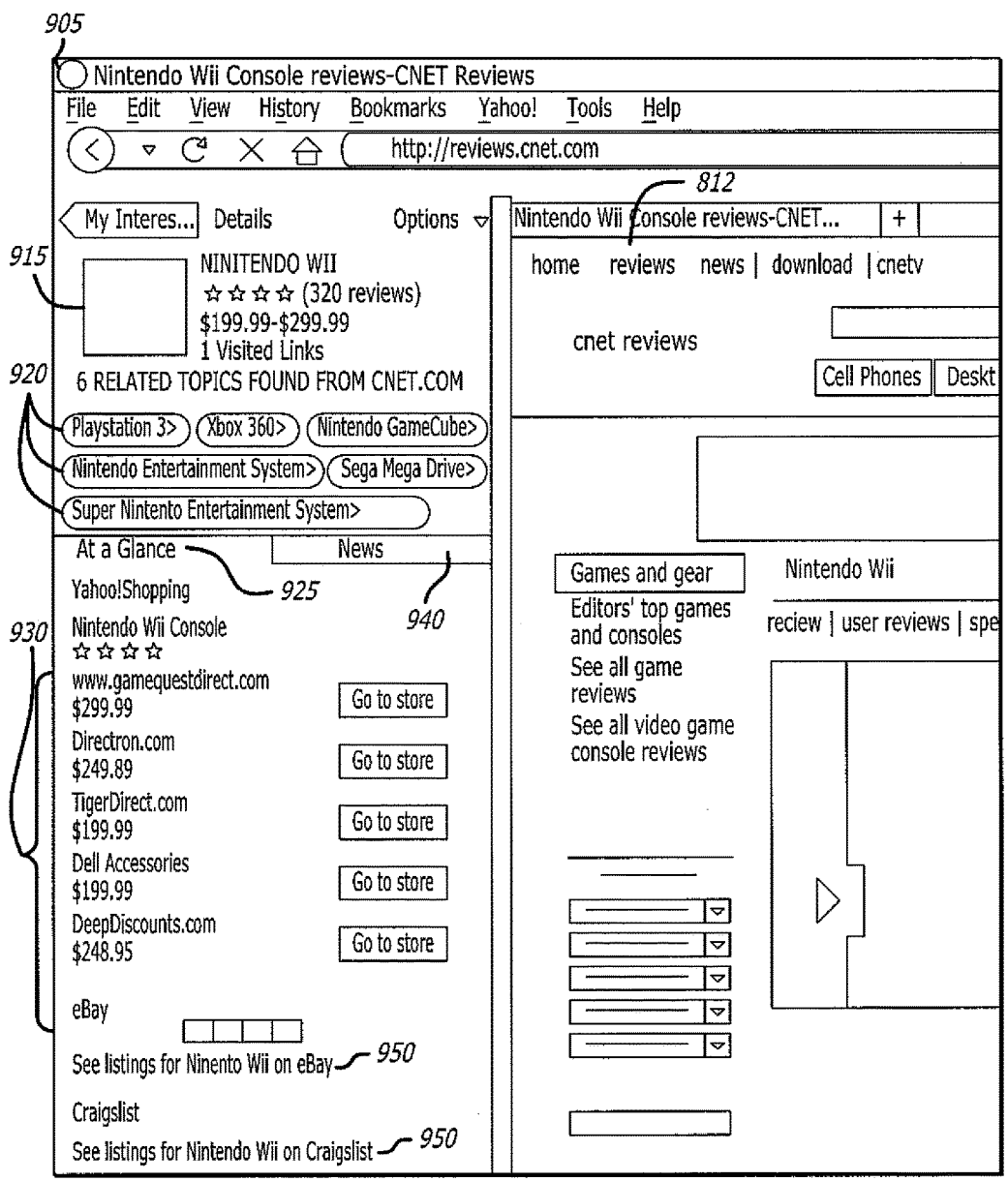
FIG. 9 is screen shot of a browser showing a detailed view in a sidebar after the user has navigated to a web page reviewing the Nintendo Wii® console in accordance with an embodiment of the present disclosure.

FIG. 9 is screen shot of an embodiment of a browser 905 showing a detailed view in sidebar 910 after the user has navigated to the web page 812 reviewing the Nintendo Wii® console. In one embodiment, the detailed view includes an entity 915 related to the web page 812. In one embodiment, the entity 915 includes text (Nintendo Wii®), graphics (the Nintendo Wii® graphic), a price range ($199.99-$299.99), and review ratings (4 out of 5 stars).

In one embodiment, the detailed view of the sidebar 910 provides related topics 920 which are other topics related to the topic of the web page (in this example, the Nintendo Wii® console). In one embodiment, if a user selects a related topic 920, the user navigates (in the sidebar 910) to a detailed view for the selected topic. The detailed view shown in sidebar 910 also includes an "At a Glance" tab 925. When selected, the "At a Glance" tab 925 shows a context-specific view for the topic found. In this example, "Nintendo Wii" has been categorized as a Product. Therefore, the At a Glance tab 925 displays shopping information 930 (e.g., pricing information, links to online stores, a link to eBay, a link to Craigslist, etc.). The sidebar 910 also includes a News tab 940.

The user can navigate to the web page 812 from the My Interests user interface, a personalized search use case where content is displayed in the second content area 910, and/or a browsing use case where related topics are displayed in the second content area 910 and from a shared link.

Figure 10:
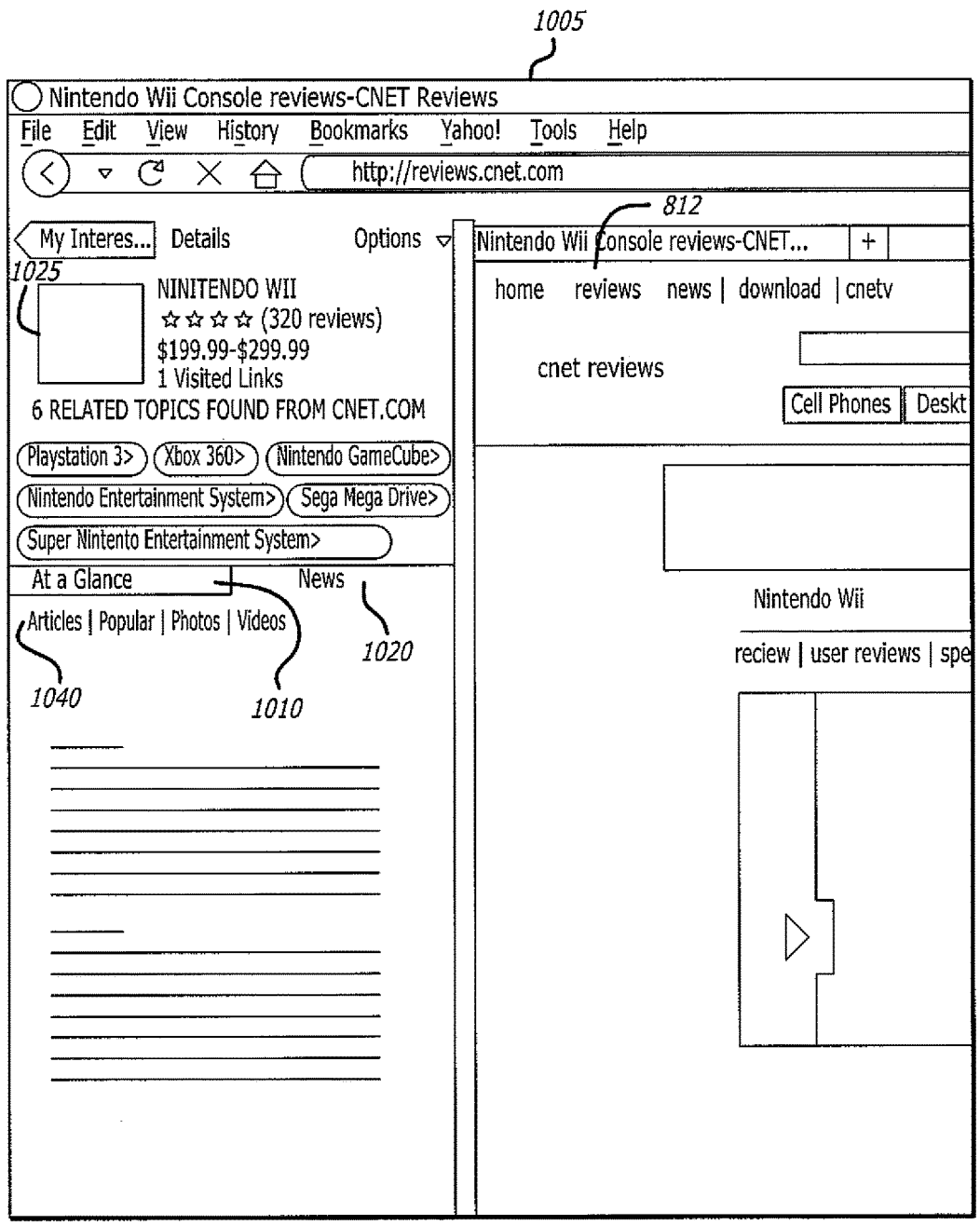
FIG. 10 is a screen shot of a browser showing a sidebar in which a News tab has been selected by the user in accordance with an embodiment of the present disclosure.

FIG. 10 is a screen shot of a browser 1005 showing a sidebar 1010 in which News tab 1020 has been selected by the user. In one embodiment, the News tab 1020 can display articles, photographs, and/or videos corresponding to the topic 1025 associated with the web page 812. The Articles button 1040 has been selected in News tab 1020. In one embodiment, articles shown when the Articles button 1040 is selected are grouped by provider and sorted based on a calculation that takes into account one or more of: 1) the number of articles found from this provider, 2) the relevancy of those articles, 3) the number of visits the user has made to articles which come up in the results, 4) the number of visits the user has made to the domain, and/or 5) whether the domain has been marked as a "favorite" by the user.

An embodiment of pseudocode of the computing device 105 for displaying articles for a topic is as follows:

```
Begin
    Pull article data for topic from server computer
    Loop over article results
        Augment article "sort weight" based on user visits to this article
        Augment article "sort weight" based on whether it is a browser
        bookmark
```

```
    Place article into appropriate "domain bucket"
    Add this article's weight to that bucket's weight
End Loop
Loop over domain "buckets"
    If domain is on blacklist for this category type (stored on client)
        Remove domain "bucket"
    Else
        Augment domain weight by number of visits from
        domain-based history
        Augment domain weight if a "favorite" domain (stored on
        computing device)
    End if
End Loop
Sort domain "buckets" by sort weight
Render domains, starting with highest weight, until cut-off reached
End
```

It should be noted that the "article" referenced above in the pseudocode can be replaced with a photograph, a video, etc.

An embodiment of pseudocode of the server computer 110 for displaying articles for a topic is as follows:

```
Begin
    If article data for this topic is in the cache
        Return cached articles
    Else
        Fetch 100 articles from top article sources
        Add resulting articles to the appropriate cache
        Return resulting articles
    End If
End
```

It should be noted that the "article" referenced above in the pseudocode can be replaced with a photograph, a video, etc.

Figure 11:
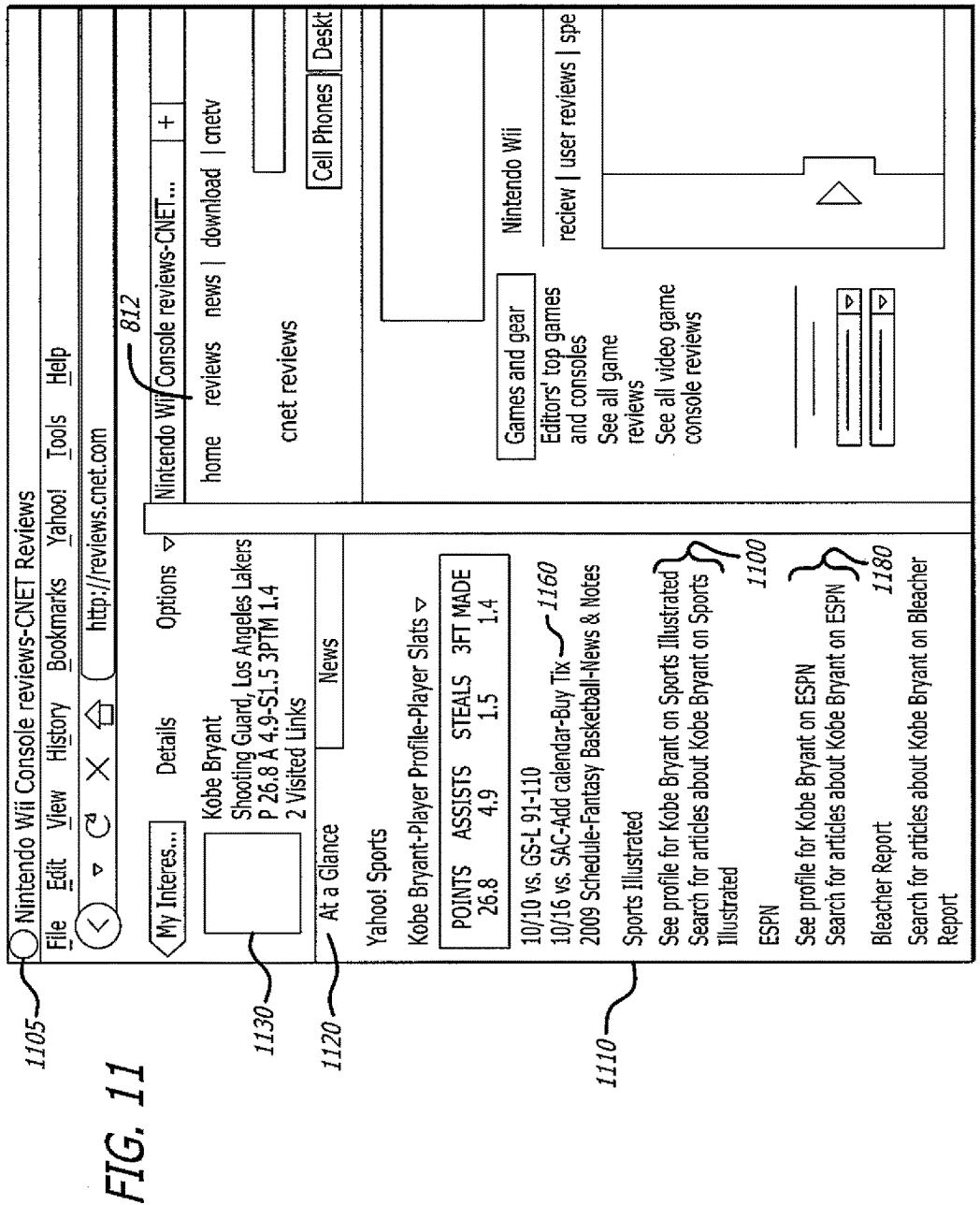
FIG. 11 is a screen shot of a browser showing a sidebar containing an athlete detail view in accordance with an embodiment of the present disclosure.

FIG. 11 is a screen shot of a browser 1105 showing a sidebar 1110 containing an athlete detail view. In the athlete detail view, different content is available under the "At a Glance" tab 1120. This view was reached when the user selected "Kobe Bryant" from the Followed Topics 830 of FIG. 8. Kobe Bryant is the topic 1130 in this detailed view. The topic 1130 includes a picture of Kobe Bryant as well as information about Kobe Bryant, such as his position (Shooting guard), his team (Los Angeles Lakers), and his statistics (e.g., 26.8 points per game). In the first content area, the browser 118 is still displaying the web page 812 about the Nintendo Wii® console review. The information displayed under the "At a Glance" tab 1120 is different than the information displayed in FIGS. 8-10. In particular, when the topic 1130 is an athlete and the category is Sports, in one embodiment information is displayed related to the athlete (e.g., Kobe Bryant) and links to sports web sites (e.g., Sports Illustrated, ESPN, etc.) are displayed. In one embodiment, the user can use the "My Interests" view shown in FIG. 8 to pull up recent or 'favorited' topics, so the user does not have to be on a web page where that topic is found to use the user interface to obtain information on a previously viewed topic. This is the reason behind viewing Kobe Bryant in FIG. 11 while still on the Nintendo Wii page 812.

Figure 12:
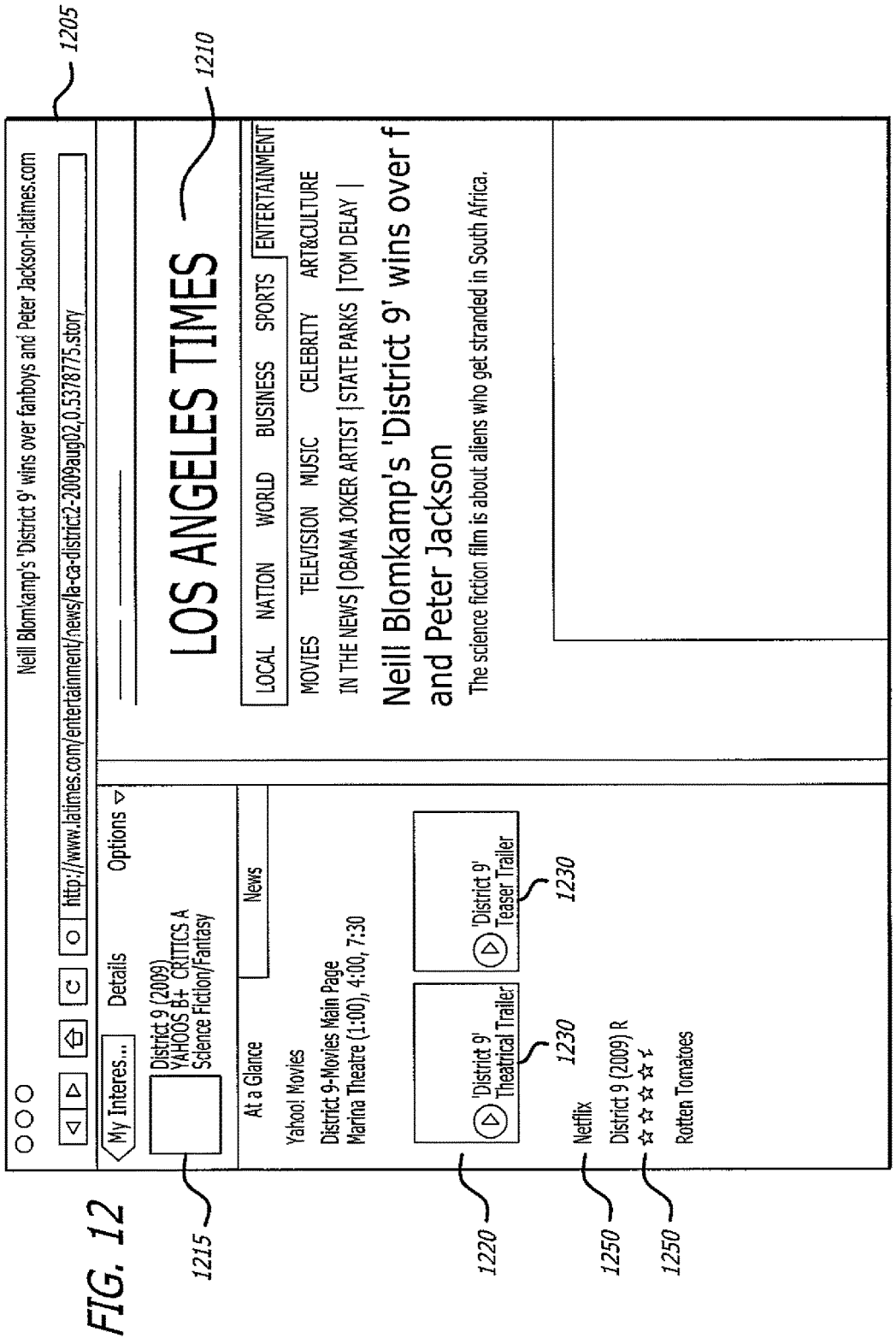
FIG. 12 is a screen shot of a browser that has navigated to a web page describing a movie "District 9" in accordance with an embodiment of the present disclosure.

FIG. 12 is a screen shot of a browser 1205 that has navigated to a web page 1210 describing a movie "District 9". An entity 1215 for the web page 1210 is determined and shown in sidebar 1220. The entity 1215 includes a topic for the web page 1210 ("District 9"), a graphic and some reviews of the movie. The sidebar 1220 includes, for example, trailers 1230, 1240, a link to a Netflix 1250, and movie reviews 1260.

In one embodiment, a browser history associated with the browser 118 is associated with topics. Thus, in one embodiment two web pages not immediately seen to be related based on their titles could in fact be found to be related based on the major topics of the web pages. Topic-based browser history can be displayed based on the topics the user is currently browsing. Thus, when a user accesses information about the topics the user is following or which are related to the web page to which the user has currently navigated, browser history will be accessed such that web pages from the user's history which correlate to the topic(s) in question will be shown.

Figure 13:
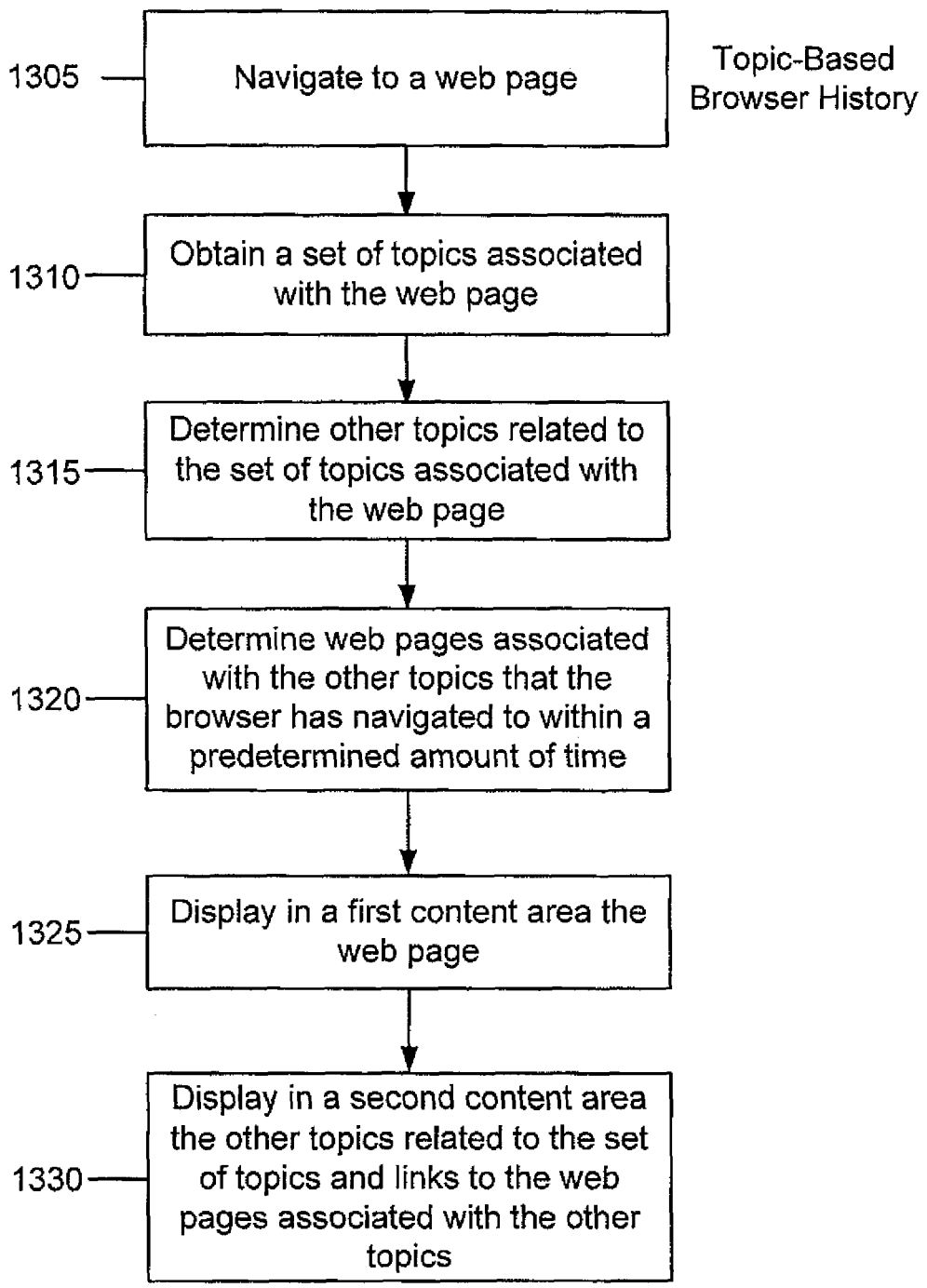
FIG. 13 is a flowchart illustrating steps performed by the client-side module to determine topic-based browser history in accordance with an embodiment of the present disclosure.

FIG. 13 is a flowchart illustrating an embodiment of steps performed by the client-side module 125 to determine topic-based browser history. The user uses the browser 118 to navigate to a particular web page (step 1305). In one embodiment, the client-side module 125 obtains a set of topics associated with the web page to which the user navigated (step 1310). These set of topics can be retrieved from storage 157 or can be received from the server computer 110. The client-side module 125 then determines other topics related to the set of topics associated with the web page (step 1315). The client-side module 125 then determines web pages associated with the other topics that the browser 118 has navigated to within a predetermined amount of time (e.g., within a set number of hours, within a set number of days, etc.) (step 1320). The browser 118 displays the web page in the first content area 130 (step 1325) and the other topics related to the set of topics and one or more links to web pages associated with the other topics in the second content area 135 (step 1330).

In one embodiment, the client-side module 125 transmits the URL of the web page to the server computer 110. The server computer 110 receives the URL and obtains (e.g., retrieves from server storage 155) a set of topics associated with the web page. In one embodiment, the server computer 110 determines other topics related to the set of topics associated with the web page and also determines web pages associated with the other topics that the browser has navigated to within a predetermined amount of time. The server computer 110 transmits the other topics and links to the web pages associated with the other topics to the client-side module 125 for display in the second content area 135 of the browser 118. In another embodiment, the client-side module 125 determines other topics related to the set of topics associated with the web page and determines web pages associated with the other topics that the browser has navigated to within a predetermined amount of time.

Figure 14:
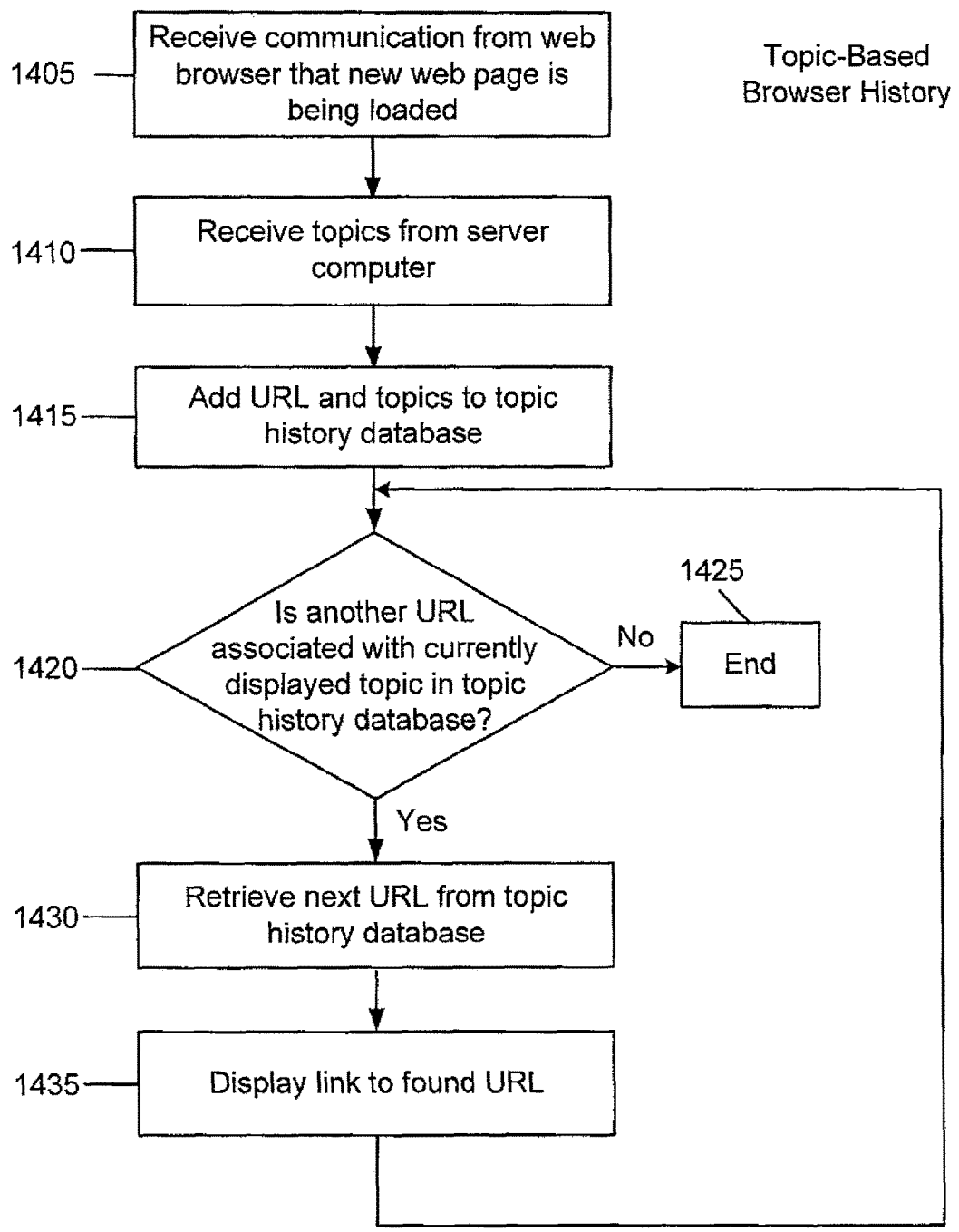
FIG. 14 is a flowchart illustrating steps performed by the client-side module to collect topic-based browser history in accordance with an embodiment of the present disclosure.

FIG. 14 is a flowchart illustrating steps performed by the client-side module 125 to collect topic-based browser history. The client-side module 125 receives communication from the web browser that a new web page is being loaded (step 1405). As described above, the client-side module 125 receives topics (e.g., an entity) associated with the web page from the server computer 110 (step 1410). As described above, the server computer 110 can retrieve this topic information (e.g., entity) from its server storage 155 or can analyze the new web page once the server computer 110 receives the request 140 for topics associated with the web page (e.g., once the server computer 110 receives a URL). The client-side module 125 adds the URL of the web page and the received topic(s) to a topic history database (or memory) (e.g., storage 157) associated with the client-side module 125 (step 1415). The client-side module 125 then determines whether there is another URL associated with the currently displayed topic in the topic history (step 1420). If not, the process ends (step 1425).

If there is another URL associated with the currently displayed topic in the topic history database 157, the client-side module 125 retrieves the next URL from the topic history database 157 (step 1430). The client-side module 125 then displays the link to the found URL (step 1435) in the second content area 135 of the browser 118. This is shown above in the Recent Topics section 840 of FIG. 8. In one embodiment, the client-side module 125 only performs step 1435 if the second content area (e.g., sidebar) is open. In a further embodiment, the client-side module 125 displays an alert that there is a new topic to display. If the user accepts the alert, the new topic is displayed. In one embodiment, topic encounters stored to storage 157 are used as a cue for when to show notifications to the user.

In one embodiment, to determine the web pages that other users have visited which relate to particular topics in a particular period of time, the topics related to URLs are stored in a database. This results in the content of the database being keyed and therefore searchable by topic. Thus, the URLs that the user has previously visited related to that topic can be determined. In one embodiment, a score is calculated for each stored URL. In one embodiment, this score is based on total visits and/or date of last visit. In one embodiment, topics related to a web page are automatically added to a user's topic history. In another embodiment, the user has to perform an explicit action (e.g., a topic must be accessed/viewed) for an item to be added to the user's topic history.

Figure 15:
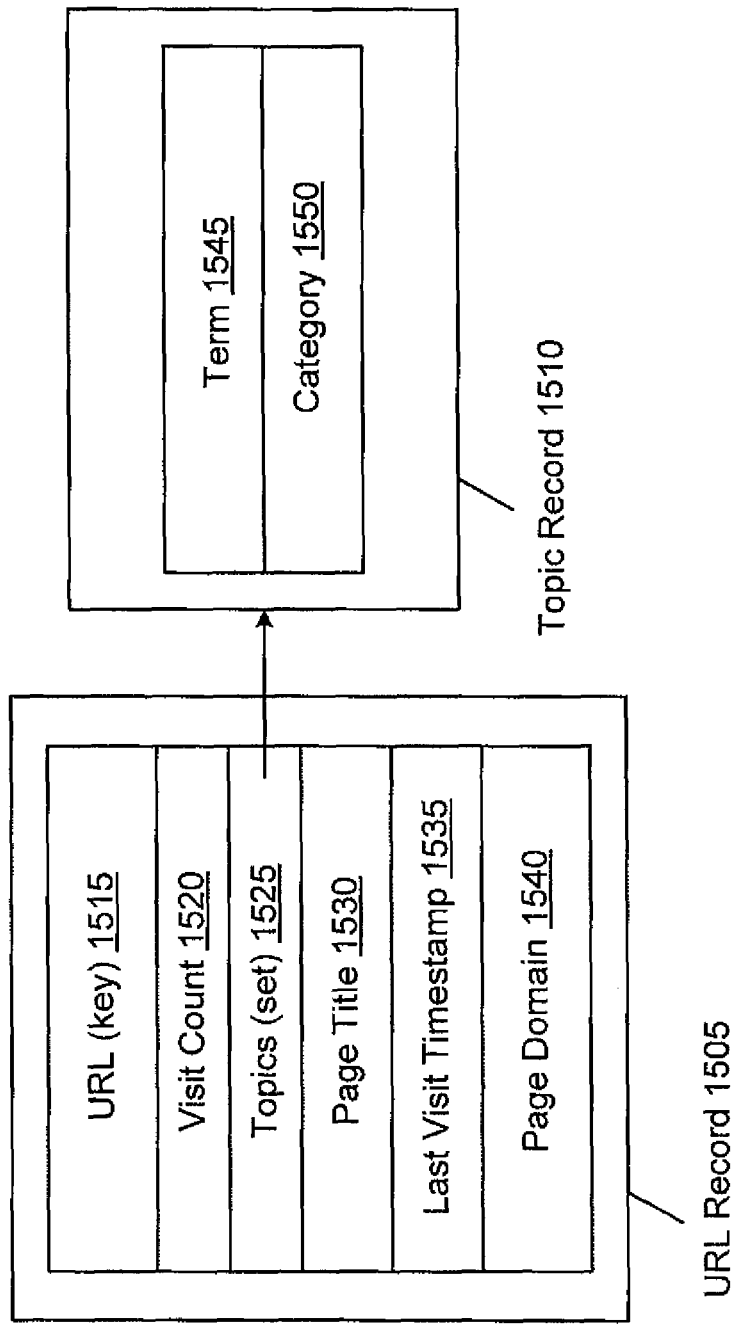
FIG. 15 illustrates database schema used to store topic-based browser history in a topic history database in accordance with an embodiment of the present disclosure.

FIG. 15 illustrates an embodiment of database schema used to store topic-based browser history in the topic history database 157. The database schema includes a URL record 1505 which links to a topic record 1510. The URL record 1505 includes a URL field 1515 (which, in one embodiment is the key of the URL record 1505), a visit count field 1520 representing the number of times a user has visited the URL, a topics field 1525 representing the topic or topics associated with the URL, a page title field 1530 representing the title of the web page associated with the URL, a last visit timestamp field 1535 representing the last time the user has visited the URL, and a page domain field 1540 representing the domain of the web page associated with the URL. In one embodiment, the topics field 1525 links to the topic record 1510. The topics record 1510 includes a term 1545 representing one or more terms associated with the topic and a category 1550 representing one or more categories associated with the topic.

An embodiment of pseudocode of the computing device 105 for adding a URL and topics to the topic history database 157 is as follows:

```
Begin
    If record for current URL found in database
        Pull record
        Replace page title with current page title
        Create topic set based on each current topic
        Replace topic set with topics found
        Increment visit count
        Replace existing record with updated record
    Else
        Create new record
        Set URL of new record to current URL
        Set page title of record to current page title
        Create topic set based on each current topic
        Set topic set in new record to topic set created
        Add new record to database
    End if
End
```

Referring again to FIG. 7, links from the user's topic-based browser history are shown. For example, the links titled "amazon kindle", "Kobe Bryant", and "kobe bryant" are links from the user's browser history. These links also show the data from the last visit timestamp field 1535 (e.g., "44 mins ago", "48 mins ago", and "49 mins ago"). Thus, the client-side module 125 can maintain a browser history associated with topics of web pages.

In one embodiment, the client-side module 125 scans the web sites across broad categories to which a particular user frequently navigates. The client-side module 125 can then use that information to suggest actions for those categories based on the history.

For example, suppose a service provider (e.g., Yahoo! Inc. of Sunnyvale, Calif.) is presenting a user interface based around a movie that is available for sale or rent. In one embodiment, the client-side module 125 determines which domain(s) involved in movie sales the user navigated to the most. The client-side module 125 can then provide buttons to buy or rent from those web sites based on the user's history.

Figure 16:
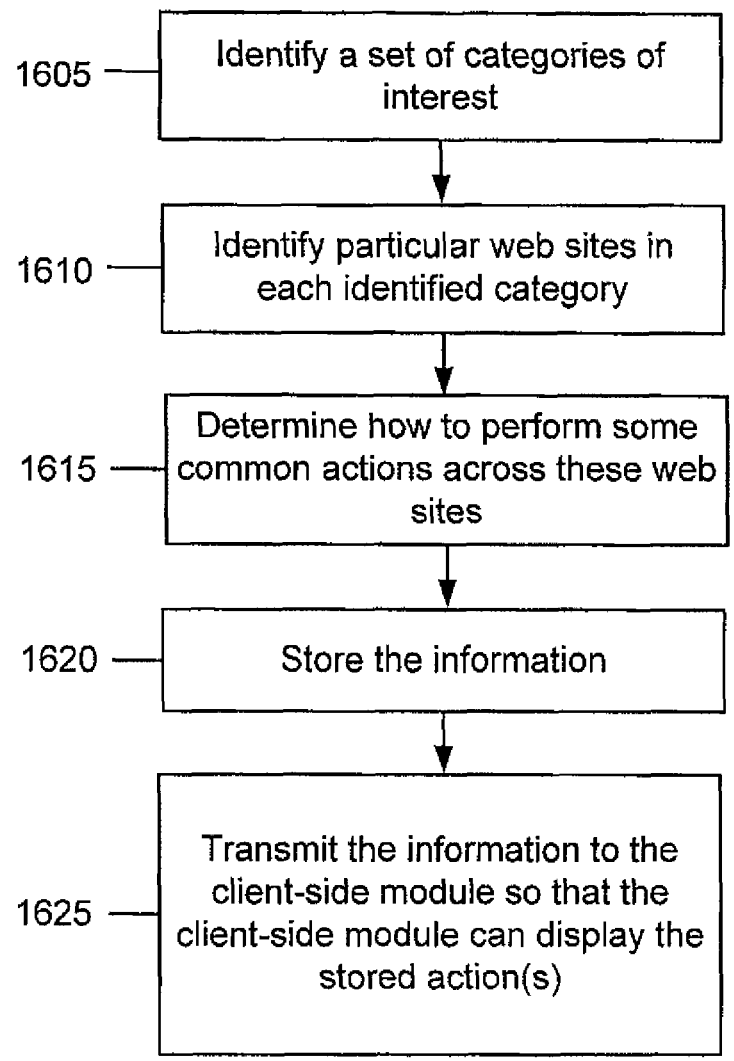
FIG. 16 is a flowchart illustrating steps performed by the server computer of FIG. 1 for the client-side module to suggest one or more actions to a user in accordance with an embodiment of the present disclosure.

FIG. 16 is a flowchart illustrating an embodiment of steps performed by the server computer 110 for the client-side module 125 to suggest one or more actions to a user based on web sites to which the user frequently navigates. In one embodiment, the server computer 110 identifies a set of categories for which action information will be provided (step 1605). In one embodiment, the set of categories are predetermined. Alternatively, the user selects one or more categories for which the user would like to have action suggestions.

The server computer 110 then identifies particular web sites (also referred to as "best of breed" sites) in each identified category (step 1610). The server computer 110 then determines how to perform some common actions across the identified web sites (step 1615). This information is then stored in server storage 155 (step 1620). In one embodiment, the server computer 110 then transmits the information to the client-side module 125 so that the client-side module 125 can display the stored action(s) (step 1625).

In one embodiment, the actions suggested include actions from sites that are applicable across categories (e.g., Facebook and/or Twitter). For example, a user can be viewing a movie topic and a Twitter action will appear because Twitter is stored in the user's history and interest profile.

Figure 17:
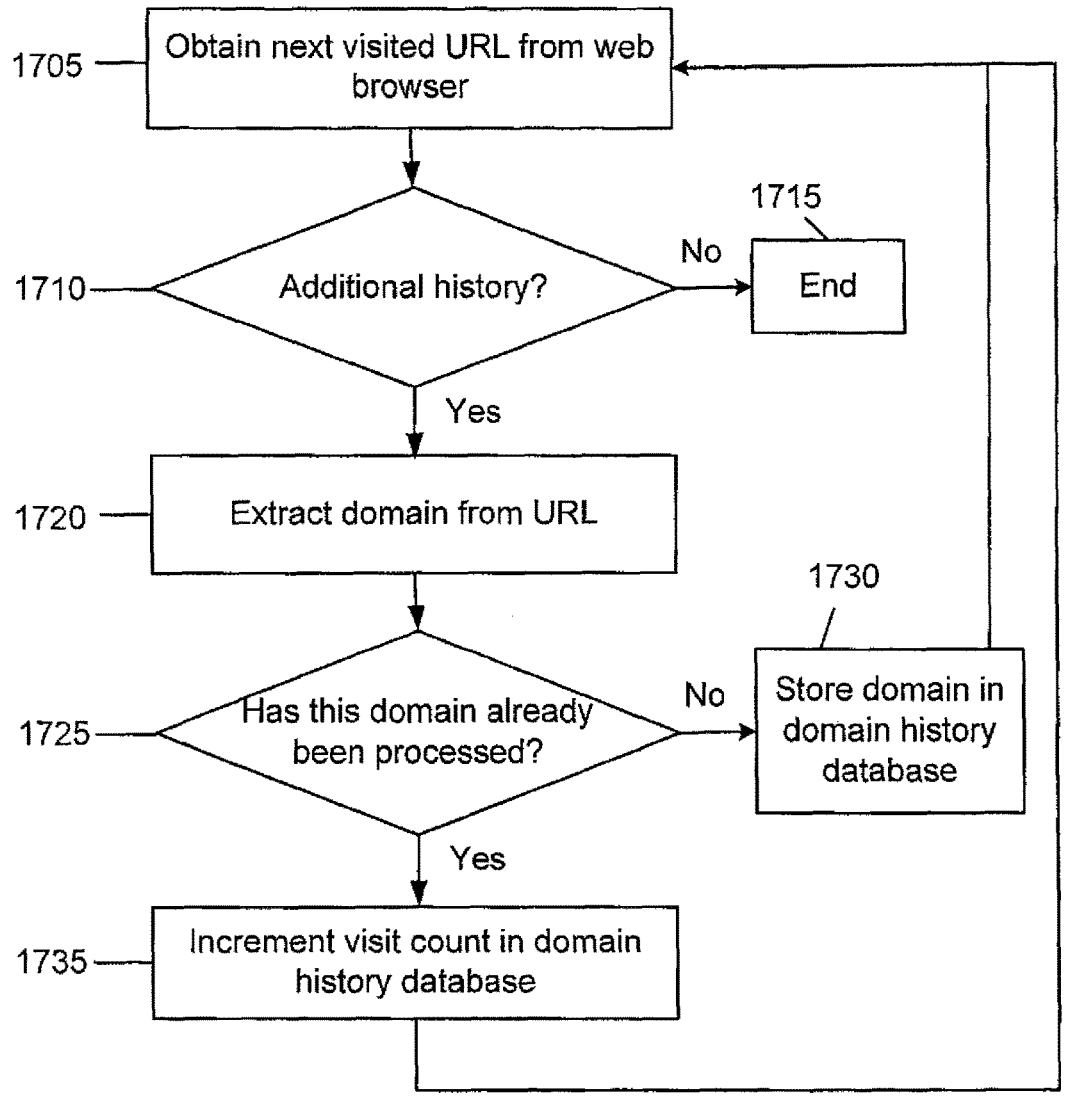
FIG. 17 is a flowchart illustrating steps performed by the client-side module to populate a domain history database in accordance with an embodiment of the present disclosure.

FIG. 17 is a flowchart illustrating an embodiment of steps performed by the client-side module 125 to populate a domain history database (or memory/storage) (e.g., storage 157). The client-side module 125 obtains the (next) visited URL from the web browser 118 (step 1705). The client-side module 125 then determines if there is additional history in the topic history database 157 (step 1710). If not, the process ends (step 1715). If there is additional history, the client-side module 125 extracts the domain from the URL (step 1720). The client-side module 125 determines if this domain has already been processed in step 1725. If not, the domain is stored in a domain history database (which may be the same as or different than the topic history database 157) (step 1730). If so, the visit count field 1520 of FIG. 15 is incremented in the domain history database 157 (step 1735). The process then returns to step 1705. In one embodiment, the domain-based browser history and topic history are distinct data sets.

Figure 18:
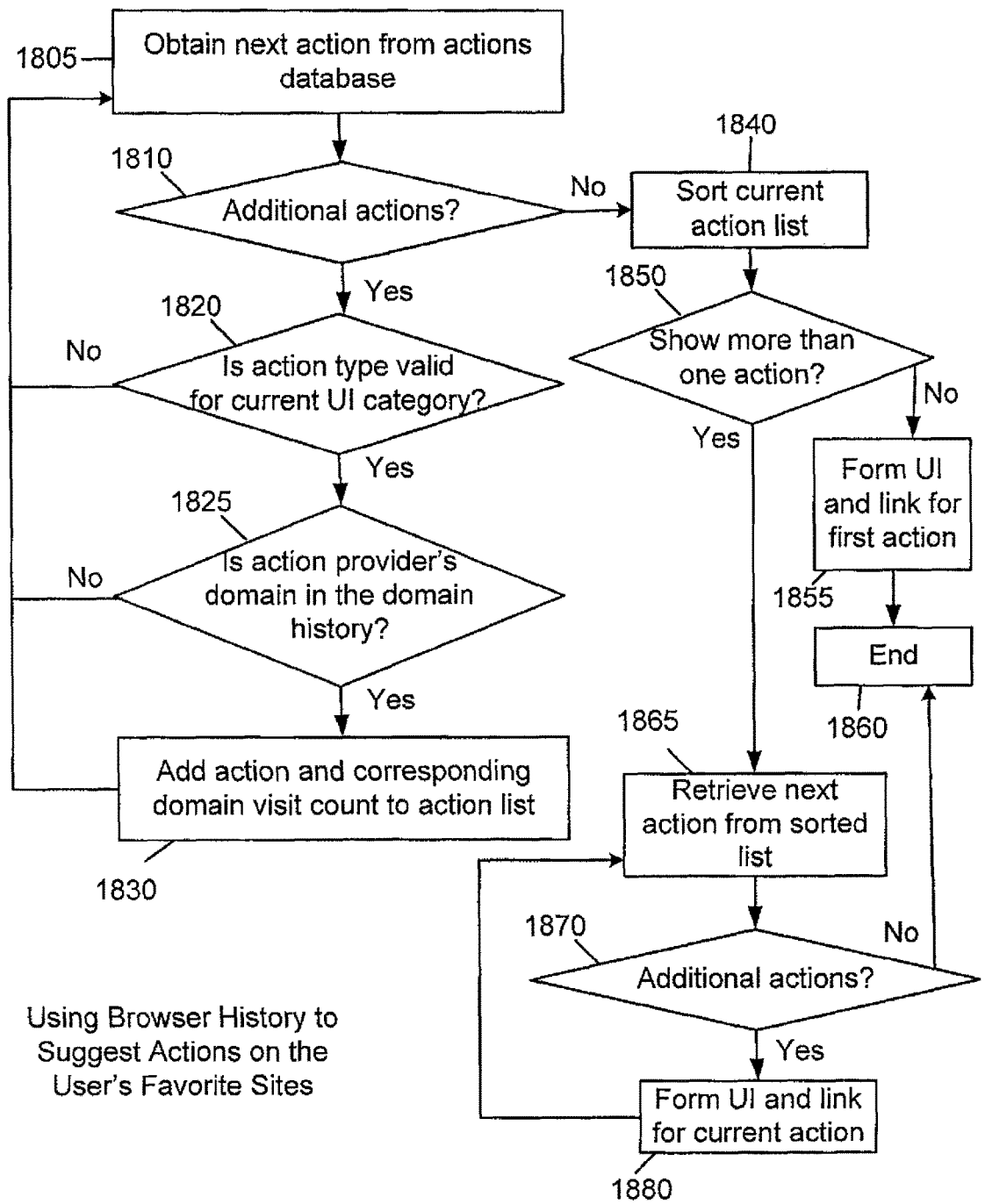
FIG. 18 is a flowchart illustrating steps performed by the client-side module to use the browser history to suggest actions associated with the user's most frequently visited web sites in accordance with an embodiment of the present disclosure.
Figure 19:
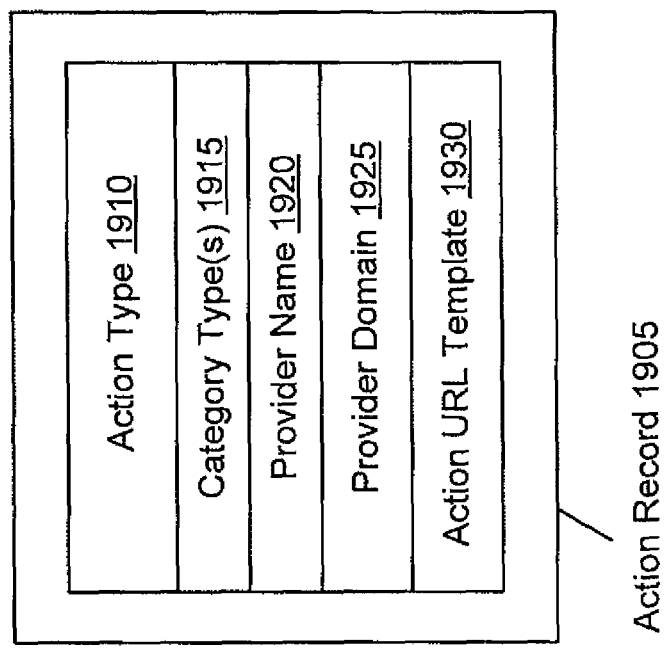
FIG. 19 illustrates database schema used to store action records in an actions database in accordance with an embodiment of the present disclosure.

FIG. 18 is a flowchart illustrating an embodiment of steps performed by the client-side module 125 to use the browser history to suggest actions associated with the user's most frequently visited web sites. The client-side module 125 obtains the next action from the actions database (which may be the same as or different than storage 157) (step 1805). FIG. 19 illustrates an embodiment of database schema used to store action records such as Action record 1905 in the actions database 157.

The Action record 1905 includes an Action Type field 1910. The Action Type field 1910 corresponds to an enumerated value uniquely identifying the type of action (such as "buy ticket", "show athlete player profile", etc.). The Action record 1905 also includes a Category Type field 1915 which corresponds to a list of one or more user interface categories in which this action is valid. The Action record 1905 also includes a Provider Name field 1920 which corresponds to a name for the provider (e.g., "Amazon.com", "ESPN", "NetFlix", etc.). The Action record 1905 also includes a Provider Domain 1925 which corresponds to the domain name for the provider's website (which can be correlated to the domain-based browser history). The Action record 1905 also includes an Action URL Template field 1930 which corresponds to a string containing a template for the URL to navigate to in order to perform this action. The string can contain substitution codes for live values related to the specific instance in which this action is appearing, such as the specific term being considered, the zip code of the current user, etc. For example, FoxSports.com supports the action "show athlete player profile" with the following URL: http://msn.foxsports.com/<league>/player?statsId=<playerID>. In one embodiment, this URL is stored in the Action URL Template field 1930, with substitution codes for league and playerID that are filled in from the live data obtained by the client-side module 125 at the time these actions are presented.

Referring again to FIG. 18, the client-side module 125 determines if there are additional actions in the actions database 157 (step 1810). If there are additional actions, the client-side module 125 determines whether the Action Type field 1910 of the Action record 1905 is valid for the current user interface (UI) category displayed by the client-side module 125 (step 1820). If not, the process returns to step 1805 to obtain the next action from the actions database 157. If the Action Type field 1910 is valid for the current UI, the client-side module 125 determines whether the Provider Domain field 1925 of the Action record 1905 is in the domain history (step 1825). If not, the process returns to step 1805 to obtain the next action from the actions database 157. If so, the client-side module 125 adds the action and the corresponding domain visit count to an action list (step 1830) in the actions database 157.

If there are no additional actions in step 1810, the client-side module 125 sorts the current action list in the actions database 157 (step 1840). In one embodiment, the client-side module 125 then determines whether to display more than one action (step 1850). If not, the client-side module 125 forms a UI and provides a link for the first action (step 1855). The process then ends (step 1860). If so, the client-side module 125 retrieves the next action from the sorted list (step 1865). The client-side module 125 then determines whether there are additional actions (step 1870). If not, the process ends (step 1860). If so, the client-side module 125 forms a UI and link for the current action (step 1880). The process then returns to step 1865.

An embodiment of pseudocode of the computing device 105 for populating domain-based history is as follows:

```
Begin
    While more URLs in browser history
        Extract domain from URL
        If domain seen in domain history list
            Increment visit count in domain history
        Else
            Add new entry in domain history for this domain
        End if
    Loop
End
```

An embodiment of pseudocode of the computing device 105 for populating an action-based UI is as follows:

```
Begin
    While more actions in action database
        If action valid for current category
            If action domain in domain-based browser history
                Add action to 'current actions' to consider
            End if
        End if
    Loop
    Sort 'current actions' in descending order by domain visits
    If showing more than one action
        While more 'current actions'
            'Form' action URL by substituting current term in action
            URL template
            Display action URL link
        Loop
    Else
        Get first 'current action'
        'Form' action URL by substituting current term in action URL
        Display action URL link
    End if
End
```

For example, referring again to FIG. 9, an action 950 is shown which enables a user to see listings for the Nintendo Wii® on eBay. Another action 960 is shown which enables a user to see listings for the Nintendo Wii® on Craigslist. Referring to FIG. 11, a single provider domain-based action for buying tickets is shown with action 1160. Multiple provider domain-based actions can be grouped by action provider, such as actions 1170 associated with Sports Illustrated and actions 1180 associated with ESPN.

In one embodiment, a user has to log into the service for these steps to occur. It should be noted that one or more of the steps described herein can be performed in any order unless otherwise noted and when the second content area is open or closed unless otherwise noted.

Figure 20:
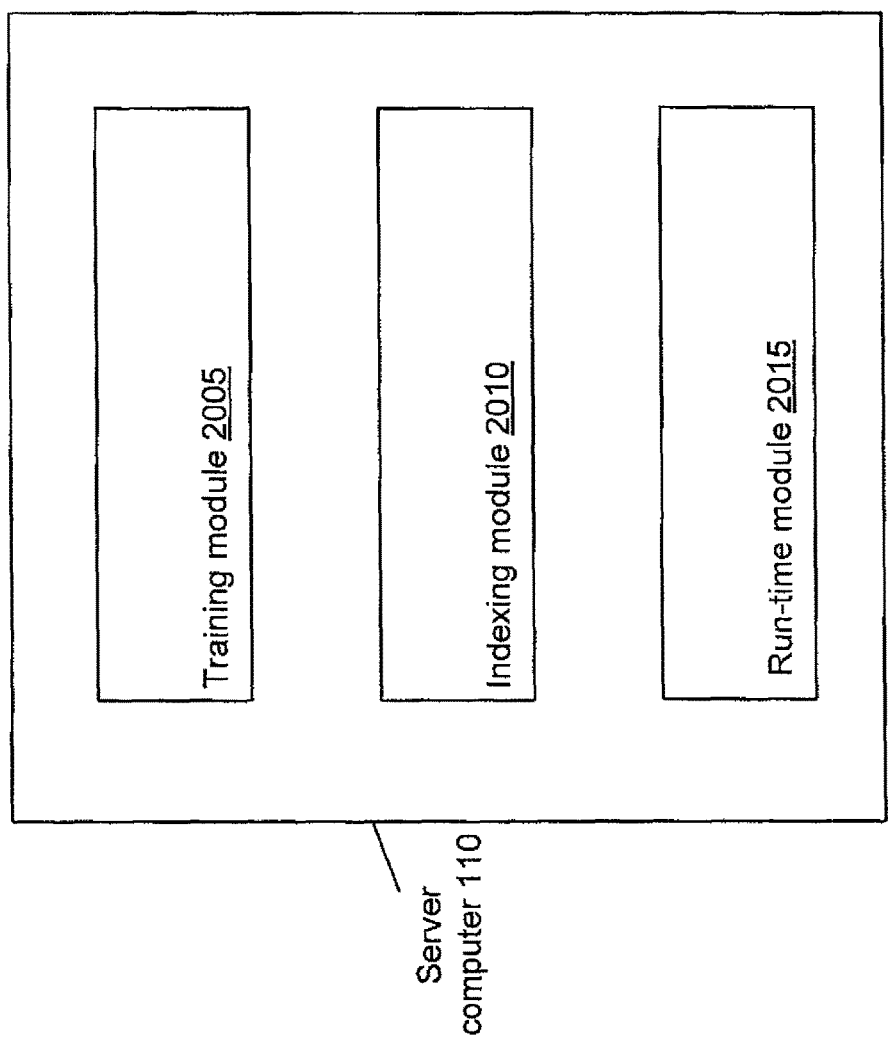
FIG. 20 is a block diagram of an embodiment of the server computer of FIG. 1 having a training module, an indexing module, and a run-time module in accordance with an embodiment of the present disclosure.
Figure 21:
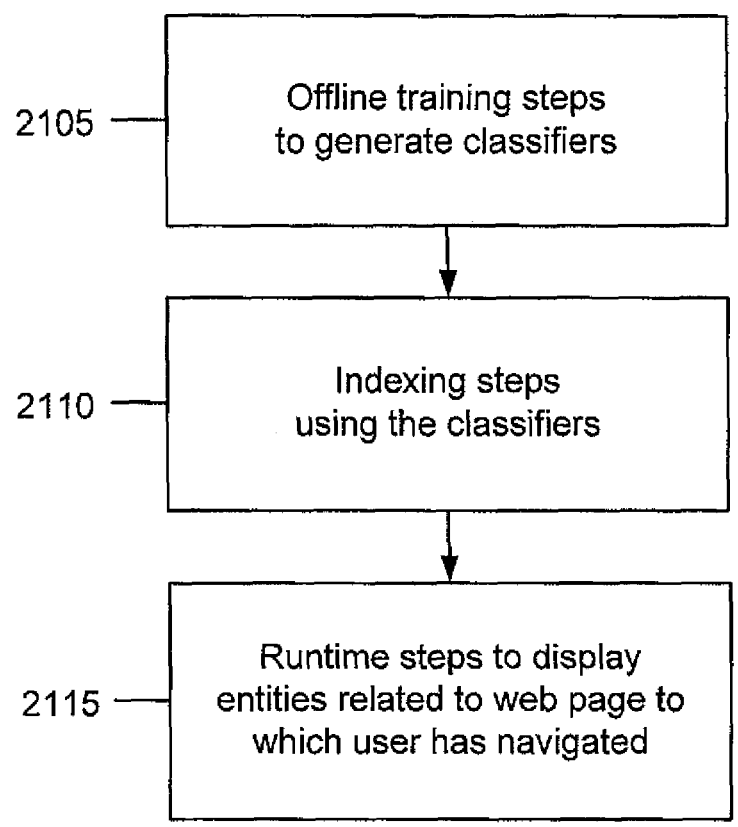
FIG. 21 is a flowchart illustrating the steps performed by the server computer modules of FIG. 20 in accordance with an embodiment of the present disclosure.

FIG. 20 is a block diagram of an embodiment of the topic and category determination module 145 in the server computer of FIG. 1. In one embodiment, the topic and category determination module 145 includes a training module 2005, an indexing module 2010 and a run-time module 2015. FIG. 21 is a flowchart illustrating the steps performed by the modules 2005, 2010, 2015 of FIG. 20. The training module 2005 performs offline training steps (step 2105) to generate two supervised machine learning models (referred to below as classifiers). As described in more detail below, the offline training steps include retrieving data and analyzing the retrieved data in order to be able to generate one or more classifiers that can then be applied to a web page in order to determine a set of topics and categories for the web page. The indexing module 2010 performs indexing steps using the classifiers generated in the training steps. The indexing steps include retrieving a web page and analyzing the web page to determine a set of topics and categories for the web page. The indexing steps store the determined topics and categories for each web page. The run-time module 2015 provides the topics and categories determined in the indexing steps when a user requests topics for a particular web page to which the user has navigated. These modules 2005, 2010, 2015 can be software, hardware, or a combination of software and hardware. For example, in one embodiment, one or more of the modules 2005, 2010, 2015 are computing devices. Further, the functionality of each module 2005, 2010, 2015 can be combined into a single software module or computing device.

Figure 22:
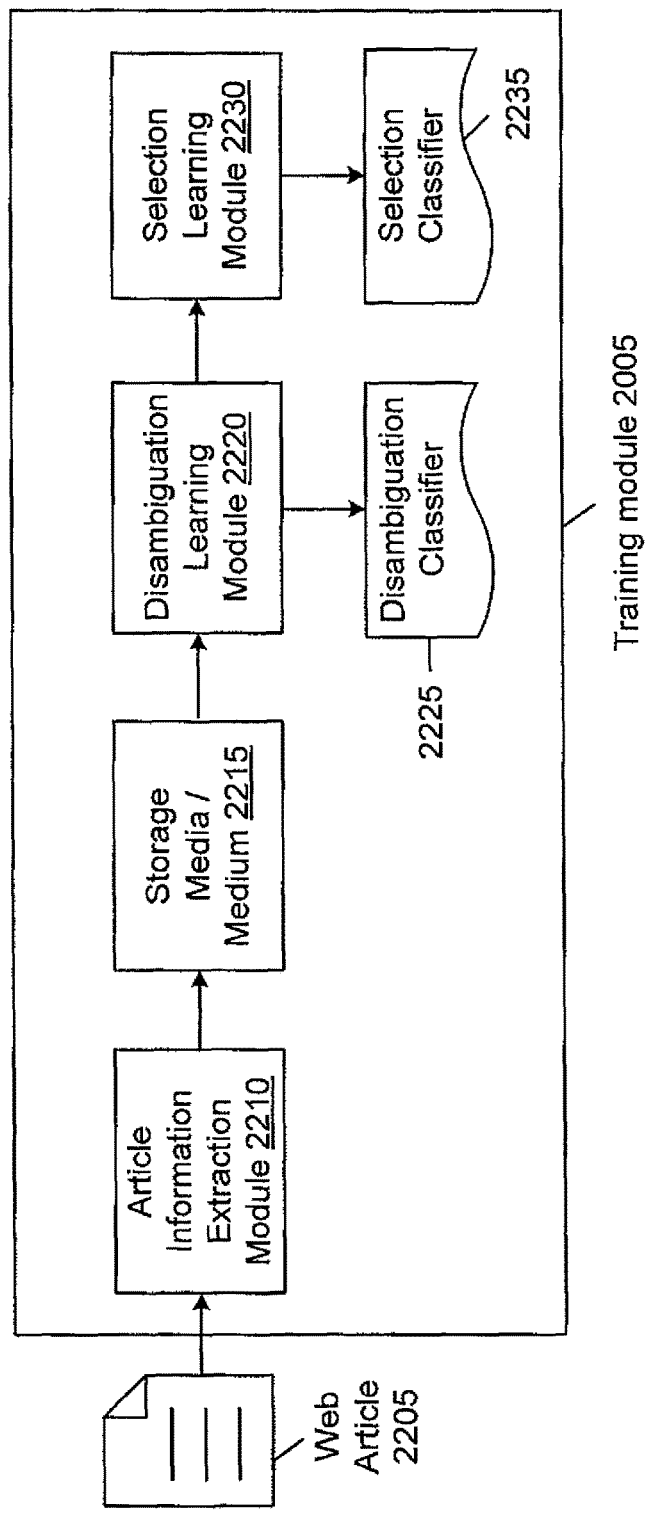
FIG. 22 is a block diagram of the training module of FIG. 21 in accordance with an embodiment of the present disclosure.
Figure 23:
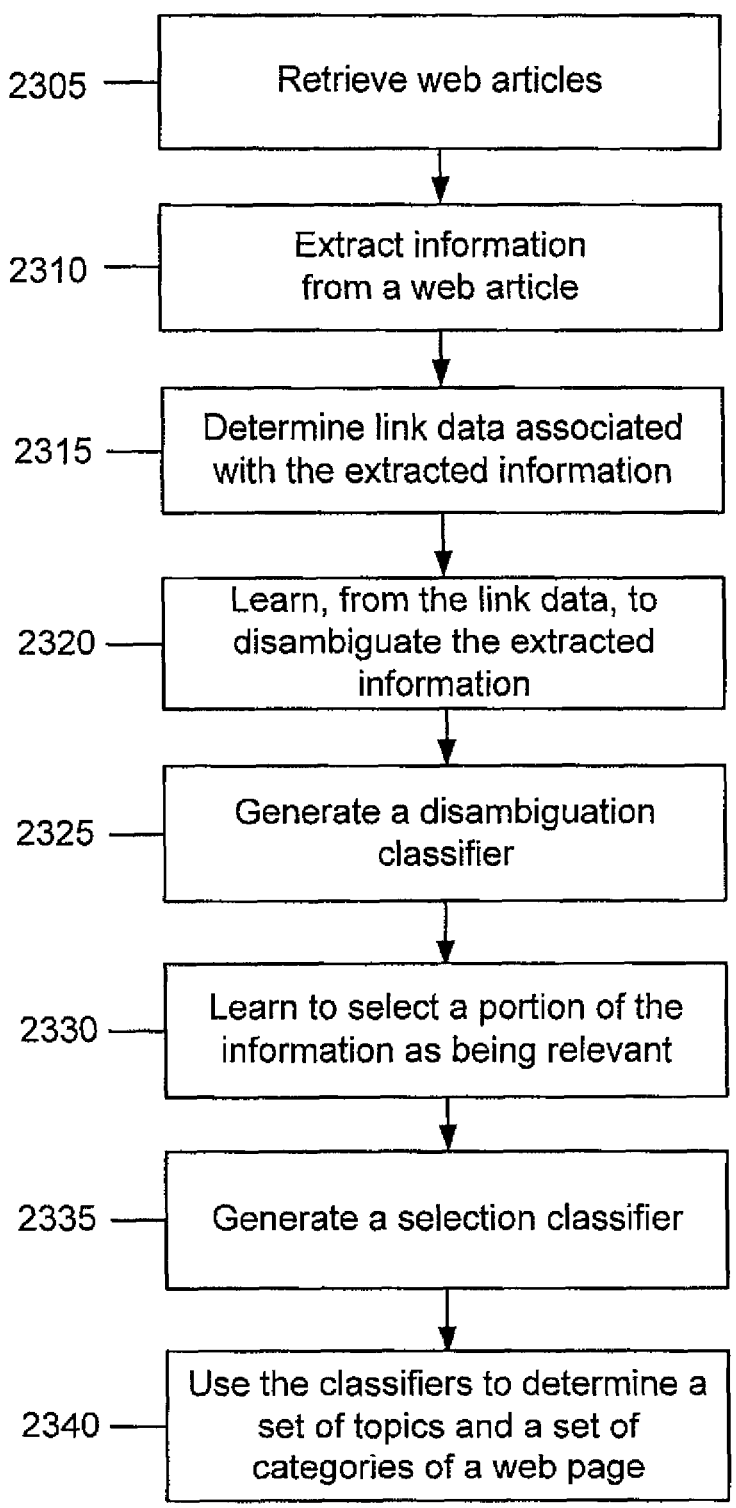
FIG. 23 is a flowchart of the steps performed by the training module of FIG. 22 in accordance with an embodiment of the present disclosure.

FIG. 22 is a block diagram of an embodiment of the training module 2005. FIG. 23 is a flowchart of an embodiment of the steps performed by the training module 2005. In one embodiment, the training module 2005 retrieves one or more web articles 2205 (step 2305).

In one embodiment, the web articles 2205 are external documents retrieved from one or more data files such as data files from a knowledge collection website such as www.wikipedia.org. Wikipedia® has a large number of articles, and each article includes a link structure and belongs to at least one category. Further, "redirect pages" enable resolution of synonyms to an article. Each link in an article points to a disambiguated article. Further, the category hierarchy in Wikipedia® is broad and deep, and the link structure of Wikipedia® articles is a valuable source of labeled training data for disambiguation and selection, as described below.

In one embodiment, the training module 2005 includes an article information extraction module 2210 to extract information from each web article 2205 (step 2310). In one embodiment, the article information extraction module 2210 is a module that disassembles the data (e.g., web articles) into a set of nodes in the Wikipedia® taxonomy. The article information extraction module 2205 can also determine link data associated with the extracted information (step 2315). The link data obtained from each web article can include, for example, its inlinks (links from other web articles), its outlinks (links to other web articles), any redirects (from synonyms), category hierarchy, and/or disambiguation (as defined below). The extraction module 2210 stores the link data and extracted information (e.g., the article's text, inlinks, outlinks, any redirects, category hierarchy, and/or disambiguation) in storage media/medium 2215 (e.g., a database). The Wikipedia® link structure forms the labeled training instances that are used to generate the disambiguation classifier and the selection classifier.

In one embodiment, a disambiguation learning module 2220 operates on the information stored in the storage media/medium 2215. As used herein, disambiguation is the process of determining a sense of a phrase (one or more contiguous words) that can have multiple senses. In one embodiment, a phrase has multiple senses if the phrase links to more than one web article. Disambiguation is the process of determining which sense is the appropriate one in a particular usage. For example, the word "tree" can relate to the woody plant or it can relate to a data structure. The way the word "tree" is used, the words around tree, etc. determine which tree usage is the correct one for a given phrase.

The disambiguation learning module 2220 learns, from the extracted information and/or link data, to disambiguate the extracted information (step 2320). In particular, in one embodiment the disambiguation learning module 2220 learns to predict the probability of a sense of an ambiguous phrase using its context (unambiguous topics). A phrase is considered unambiguous if it has only one sense. To disambiguate a phrase, feature vectors are created for the set of co-occurring unambiguous phrases. The disambiguation learning module 2220 then generates a disambiguation classifier 2225 from its learning (step 2325). In one embodiment, the disambiguation classifier 2225 is a gradient boosted decision tree created using a C4.5 algorithm. Features of disambiguation include, for example: 1) prior probability or commonness of a sense (e.g., the number of occurrences of a sense/total number of senses); 2) relatedness; and/or 3) context quality (e.g., average relatedness of context articles).

Relatedness between two topics (also referred to as concepts) is the fraction of common articles linking to both topics (concepts) versus the number of those linking to either. In one embodiment, for two Wikipedia® articles, relatedness is the Normalized Google Distance (NGD) with the function being the set of inlinks to each article. Basically, the NGD quantifies the strength of a relationship between two words. For example, "speakers" and "sound" are more related than "speakers" and "elephant." In one embodiment, the disambiguation learning module 420 finds the Yahoo! or Google PageCount when two words are used together in a search. ("Speakers" and "sound" would have a relatively high number of result pages when compared to "speakers" and "elephant."). Thus, a search distance is a measure of semantic interrelatedness derived from the number of hits returned by the Google search engine for a given set of keywords. Keywords with the same or similar meanings in a natural language sense tend to be "close" in units of search distance, while words with dissimilar meanings tend to be farther apart.

The disambiguation learning module 2220 is in communication with a selection learning module 2230. The selection learning module 2230 orders topics (concepts) on how best they describe the theme of a document (e.g., web article 2205). As used herein, the theme of a document is defined herein as an ordered list of concepts. The list is ordered on importance of the concept to the document in question. In one embodiment, topics are one or more contiguous words that appear in a document and which are the subject of an article (node) within Wikipedia®. In particular, the selection learning module 2230 learns to select a portion of the extracted information as being relevant to the theme of the web article (step 2330). Once the selection learning module 2230 has learned to select topics, a selection classifier 2235 is generated (step 2335). The selection classifier 2235 learns to predict the probability that a topic will become an anchor. In one embodiment, the selection classifier 2235 is a gradient boosted decision tree. In one embodiment, given the context output of the disambiguation classifier, the selection learning module 2230 orders topics on how best they describe the theme of the document (e.g., web page). Anchors in Wikipedia® articles are created by, for example, following a set of linking guidelines, such as from Wikipedia®. Features of the selection classifier 2235 include "keyphraseness", disambiguation probability, relatedness to context terms, depth in the Wikipedia® taxonomy, count, distribution (e.g., number of paragraphs with occurrence/total number of paragraphs).

As described in more detail below, the selection classifier 2235 is used in the indexing phase with the disambiguation classifier 2225 to determine a set of topics and categories of a web page (step 2340). It should be noted that each module 2210, 2215, 2220, 2225, 2230, 2235 of FIG. 22 may be software, hardware, or a combination of software and hardware. Further, the functionality of one or more of the modules may be combined with one or more additional modules.

Figure 24:
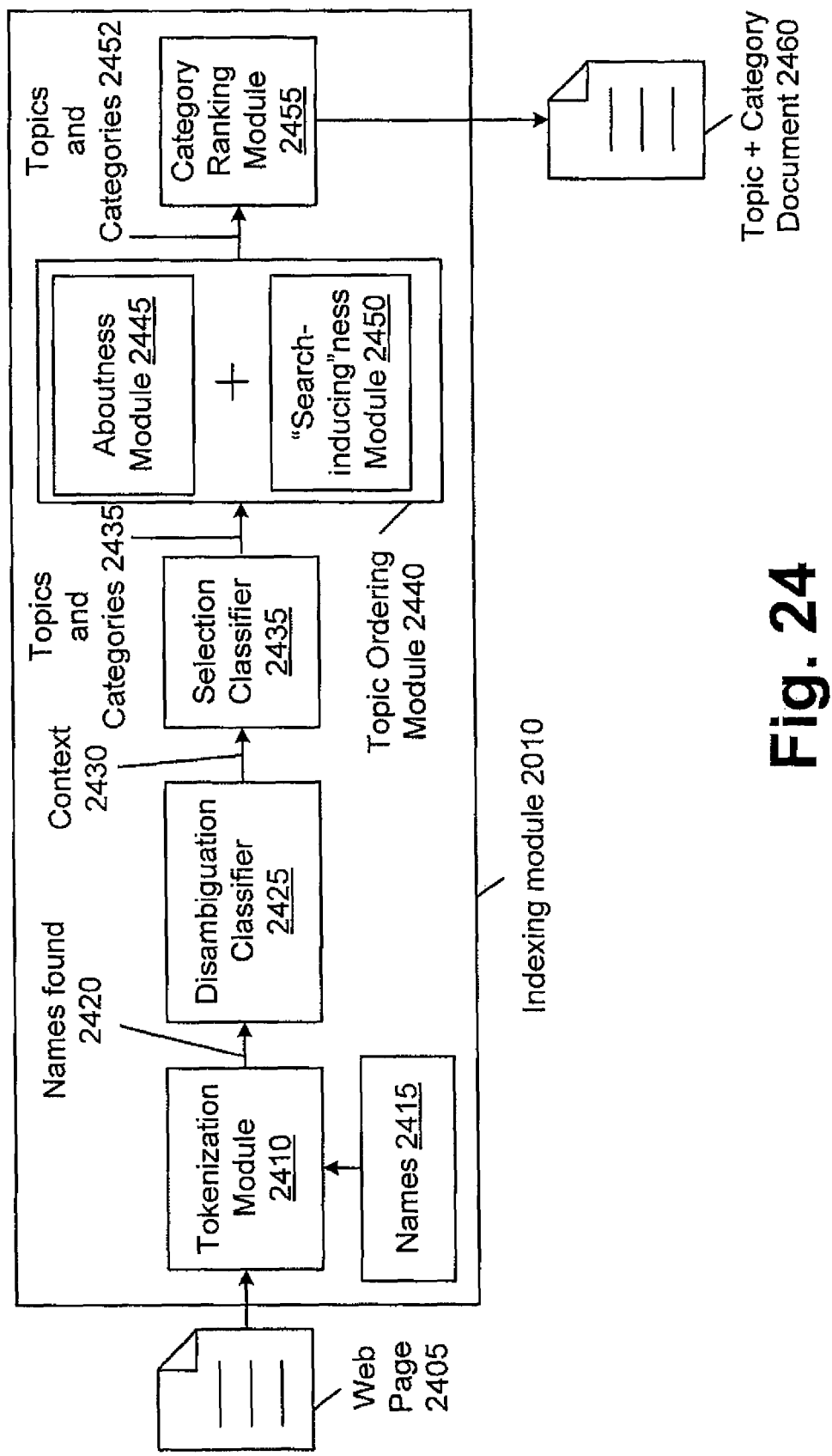
FIG. 24 is a block diagram of the indexing module of FIG. 20 in accordance with an embodiment of the present disclosure.
Figure 25:
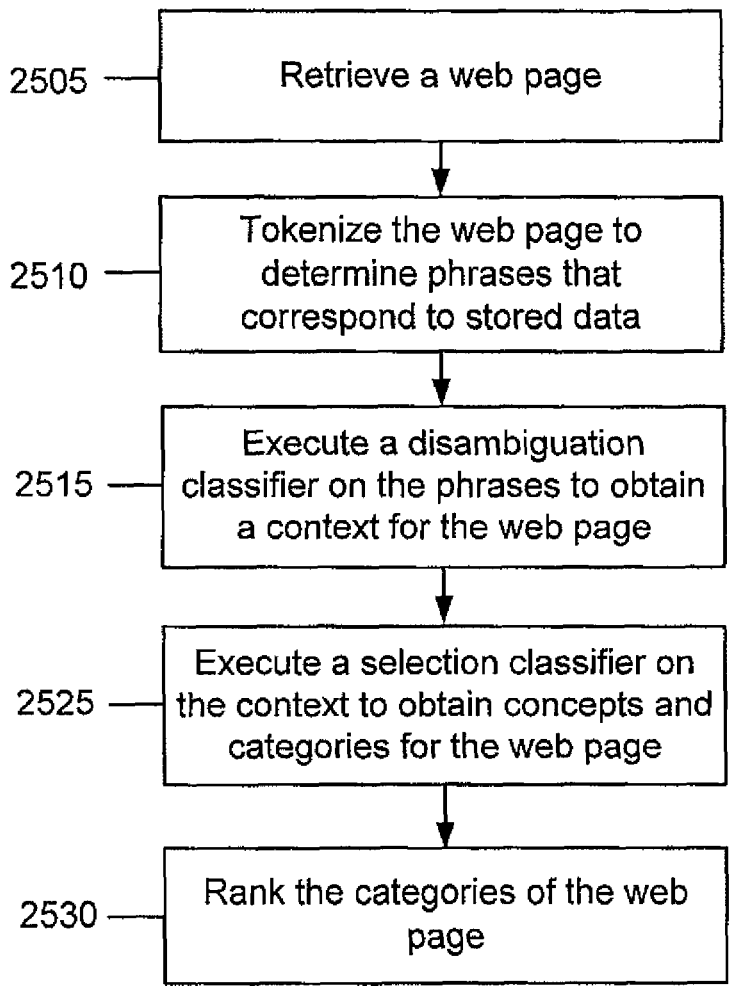
FIG. 25 is a flowchart of the steps performed by the indexing module of FIG. 24 in accordance with an embodiment of the present disclosure.

FIG. 24 is a block diagram of an embodiment of the indexing module 2010. FIG. 25 is a flowchart illustrating an embodiment of the steps performed by the indexing module 2010. After the offline training phase has been performed, the topic and category determination module 145 performs an indexing phase. In one embodiment, the topic and category determination module 145 sends out web searching software (often referred to as spiders) to "crawl" the web. As a result, the server retrieves one or more web pages 2405 (step 2505) and transmits each web page 2405 to the indexing module 2010.

The indexing module 2010 includes a tokenization module 2410. In one embodiment, the tokenization module 2410 tokenizes each crawled web page 2405 to determine phrases (one or more contiguous words) in the web page 2405 that are associated with stored data such as with Wikipedia® names 2415 (step 2510). In one embodiment, the tokenization module 2410 transmits Wikipedia® names 2420 found in the web page 2405 to the disambiguation classifier 2225. As described above, the disambiguation classifier 2225 predicts the probability of a sense of an ambiguous phrase using the context (unambiguous topics) and outputs a context 2430 for each tokenized phrase of the crawled web page 2405 (step 2515).

Figure 26:
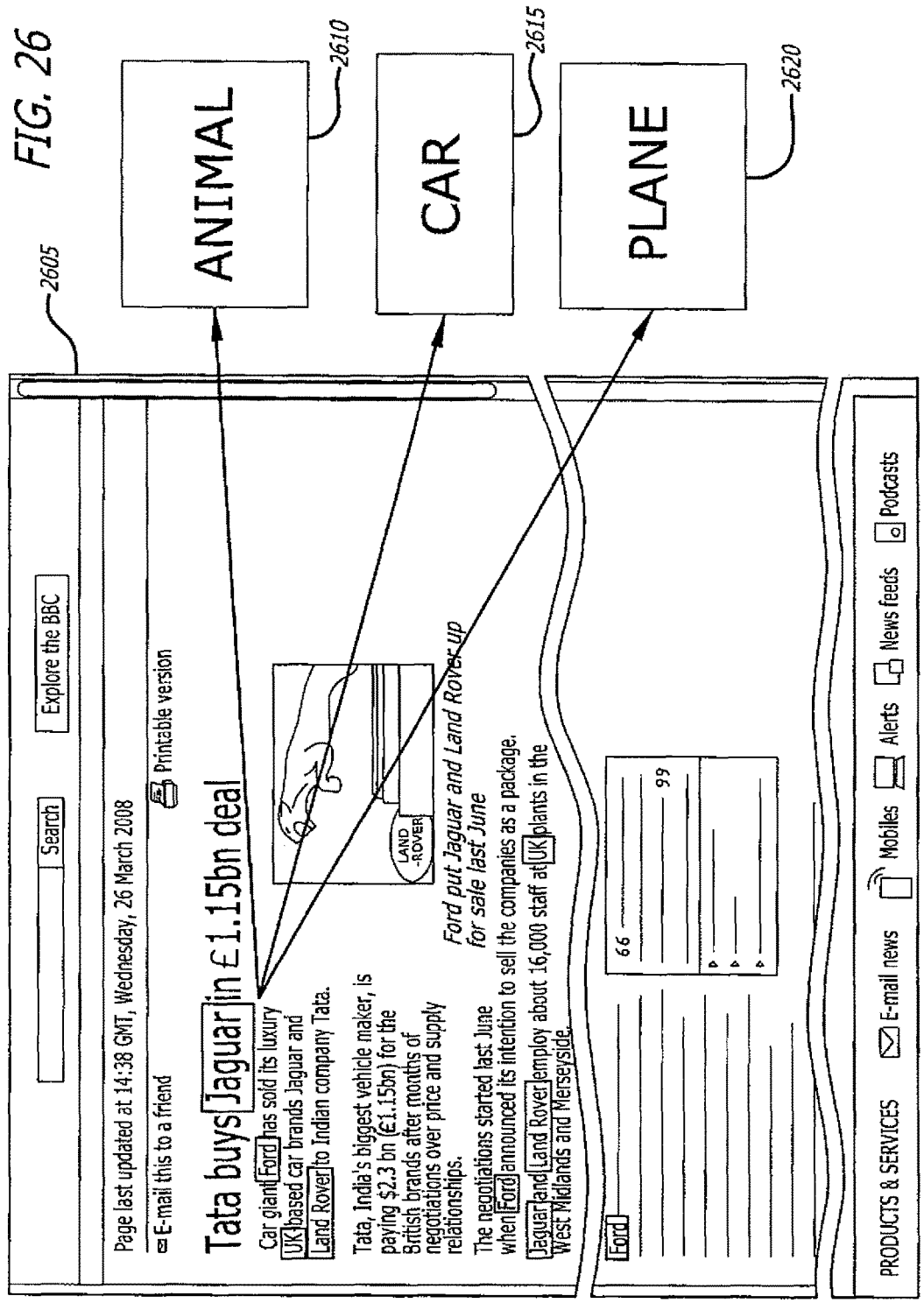
FIG. 26 is a screen shot of a disambiguation example in accordance with an embodiment of the present disclosure.

FIG. 26 is a screen shot of an embodiment of a disambiguation example. The disambiguation classifier 2225 analyzes the word "Jaguar" as found in the title of article 2605 "Tata buys Jaguar in £1.15 bn deal" and determines that "Jaguar" can be a reference to the animal (shown in box 2610), the automobile brand Jaguar (shown in box 2615), or a Jaguar fighter jet (shown in box 2620).

Figure 27A:
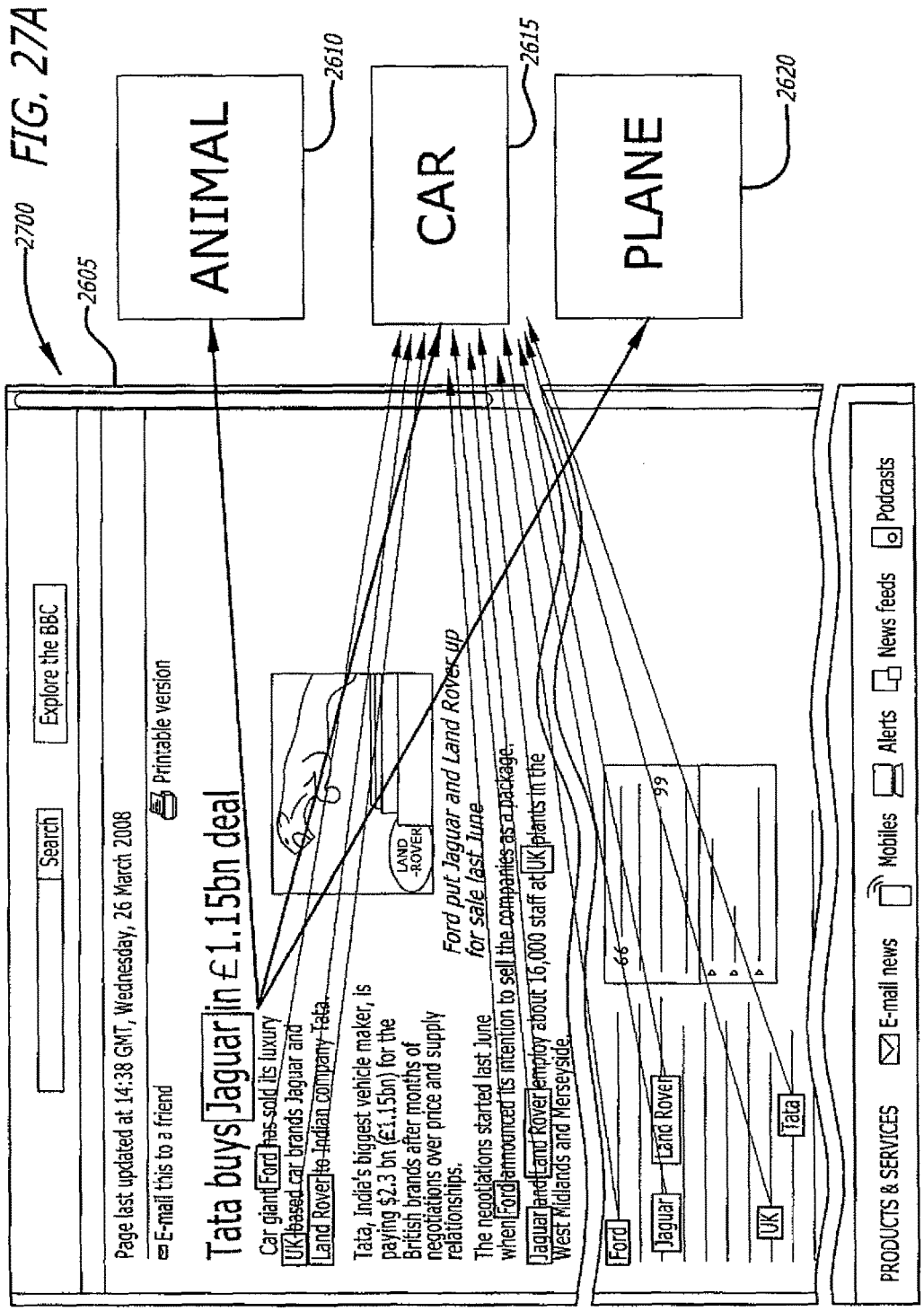
FIG. 27A is a screen shot of a disambiguation example in accordance with an embodiment of the present disclosure.

FIG. 27A is a screen shot 2700 of a further embodiment in the disambiguation example. The disambiguation classifier 2225 analyzes the article 2605 to determine that much of the phrases in the article 2605 relates to Jaguar the automobile brand 2615. The disambiguation classifier 2225 has determined the appropriate sense of the word "Jaguar" in the web article 2605. One embodiment of the output of the disambiguation classifier 2225 is shown in output window 2705 of FIG. 27B. Output window 2705 shows that the disambiguation classifier 2225 has determined that the concept or topic of the web article 2605 is "Jaguar Cars". The output window 2705 also shows that the disambiguation classifier 2225 has determined that the concept or topic "Jaguar Cars" has many associated categories, such as British brands, Car manufacturers, Tata Group, Coventry motor companies, and motor vehicle manufacturers of the United Kingdom. Each category has a corresponding weight representing how the category relates to the web article 2605. In one embodiment, the weight is a disambiguation confidence value, which can be 1 for unambiguous phrases and a value <1 for those phrases with multiple senses.

Figure 28A:
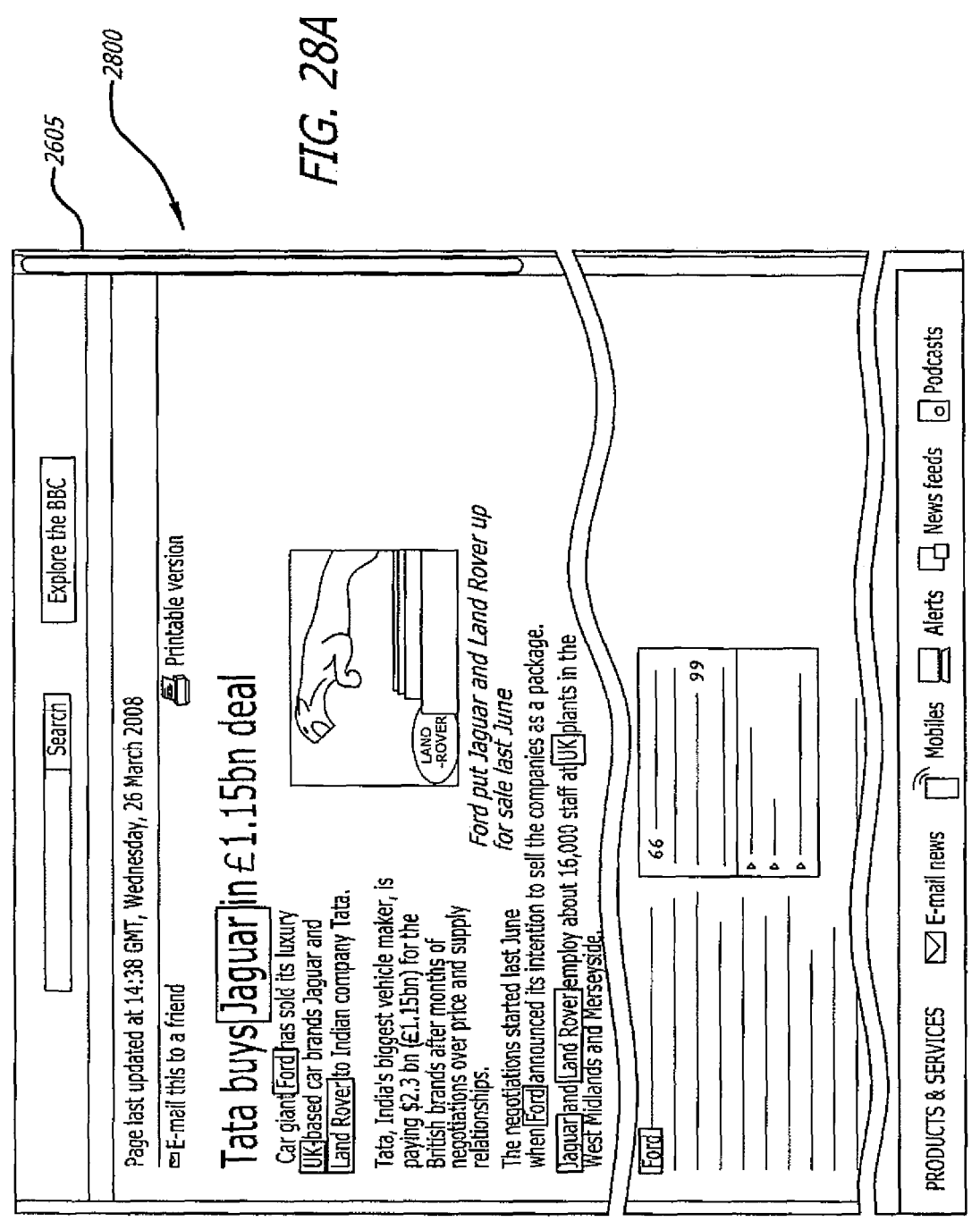

As described above, the selection classifier 2235 is applied to the context of the phrase and orders or ranks topics on how best they describe the theme of the web page 2405. FIG. 28A is a screen shot 2800 of an embodiment of a selection example. The selection classifier 2235 receives the context of phrases in the web article 2605 and ranks topics 2805 of FIG. 28B determined from the phrases based on how best the topics describe the theme of the web page 2605. An output window 2810 of FIG. 28C of the selection classifier 2235 illustrates examples of topics found and their respective weights.

Referring again to FIGS. 24 and 25, in one embodiment, the selection classifier 2235 transmits topics and categories 2435 associated with the web page 2405 into a topic ordering module 2440. The topic ordering module 2440 includes an Aboutness module 2445 and a "Search inducing"ness module 2450. The Aboutness module 2445 filters topics that are not important to the largest cluster of coherent topics. In one embodiment, the Aboutness module 2445 is a second level filter of relevance. In one embodiment, the Aboutness module 2445 removes topics that have low association with other topics in context 2430. In one embodiment, the Aboutness module 2445 is modeled as the dominance of a topic to other topics present on the web page. In one embodiment, dominance of a topic is defined as the coverage of context topics by its outlinks. As an equation, dominance of a topic is defined as:

$$\frac{|\text{Outlinks} \cap \text{Context}|}{|\text{Outlinks}|}$$

In one embodiment, the Aboutness module 2445 ranks selected topics on Aboutness and discards those topics with a value of zero. In one embodiment, the Aboutness module 2445 provides a score for each topic identified in the web page 2405. The score represents how dominant the topic is compared with other topics found for the web page 2405. In a further embodiment, the Aboutness module 2445 provides a score (representing how dominant the topic is) and a weight for the score (representing how much weight should be given for the particular score value). In one embodiment, the Aboutness module 2445 generates a classifier to learn to choose a single dominant topic in large articles.

In one embodiment, the topic ordering module 2440 also includes a "search-inducing"ness module 2450. "Search-inducing"ness describes the probability that a term would be web-searched explicitly. In one embodiment, this module 2450 re-ranks the topics 2435 transmitted from the selection classifier 2235. "Search-inducing"ness can be calculated for each topic, treating its surface forms as search queries and is a function of one or more of the following: 1) number of queries landing on the current page 2405; 2) total number of queries; and 3) change in buzz score, where buzz in general means whether the topic under consideration is receiving a lot of attention (e.g., how newsworthy the topic currently is) on the Internet.

The topics and categories output 2452 from the topic ordering module 2440 is then applied to a category ranking module 2455. In one embodiment, the category ranking module 2455 ranks the categories 2452 further. In one embodiment, each topic belongs to many different categories. In one embodiment, the category ranking module 2455 ranks categories for each topic germane to the current context. In one embodiment, categories 2452 are ranked as a function of their agreement with those of other selected topics and depth in the Wikipedia® category hierarchy. For example, the category ranking module 2455 would rank the category "American film actors" higher than "Governors of California" in a web page discussing actors for Arnold Schwarzenegger. In one embodiment, the category ranking module 2455 outputs a topic and category document 2460 (e.g., in XML) related to each web page 2405. It should be noted that each module 2410, 2415, 2225, 2235, 2440, 2445, 2450, and 2455 of FIG. 24 may be software, hardware, or a combination of software and hardware. Further, the functionality of one or more of the modules may be combined with one or more additional modules.

After the previously described phases are completed, the runtime phase is performed. A user uses the web browser displayed by the computing device 105 (as shown in FIG. 1) to navigate to a particular web page. FIG. 29 shows a screen shot of an embodiment of a web page 2905 to which the user has navigated and a sidebar 2910. The web page 2905 is displayed in a first content area 2915 of browser 2920. The sidebar 2910 is displayed in a second content area 2925 of the browser 2920. In one embodiment, URL 2930 of the web page 2905 is transmitted to the server computer 110 (as shown in FIG. 1). In one embodiment, the server computer 110 uses the URL 2930 to query its storage 155 (as shown in FIG. 1) to retrieve entities corresponding to topics associated with the web page 2905. In one embodiment, a hash is used to verify freshness of topics in the entities. The entities are displayed by the computing device in the second content area 2925 of the browser 2920. For example, entities 2940, 2945, and 2950 are displayed for the web page 2905. The entities can include, for example, text, an icon, a graphic, a link, a video, etc. associated with a topic in the set of topics.

In one embodiment, the server 110 queries its storage 155 and determines that no entities exist for the particular URL 2930. When this occurs, in one embodiment the server 110 downloads the web page 2905 and executes the indexing phase described above on the web page 2905. When the processing associated with the indexing phase is completed for the URL 2930, the server 110 transmits one or more entities associated with the web page 2905 to the computing device 105 for display.

Figure 30:
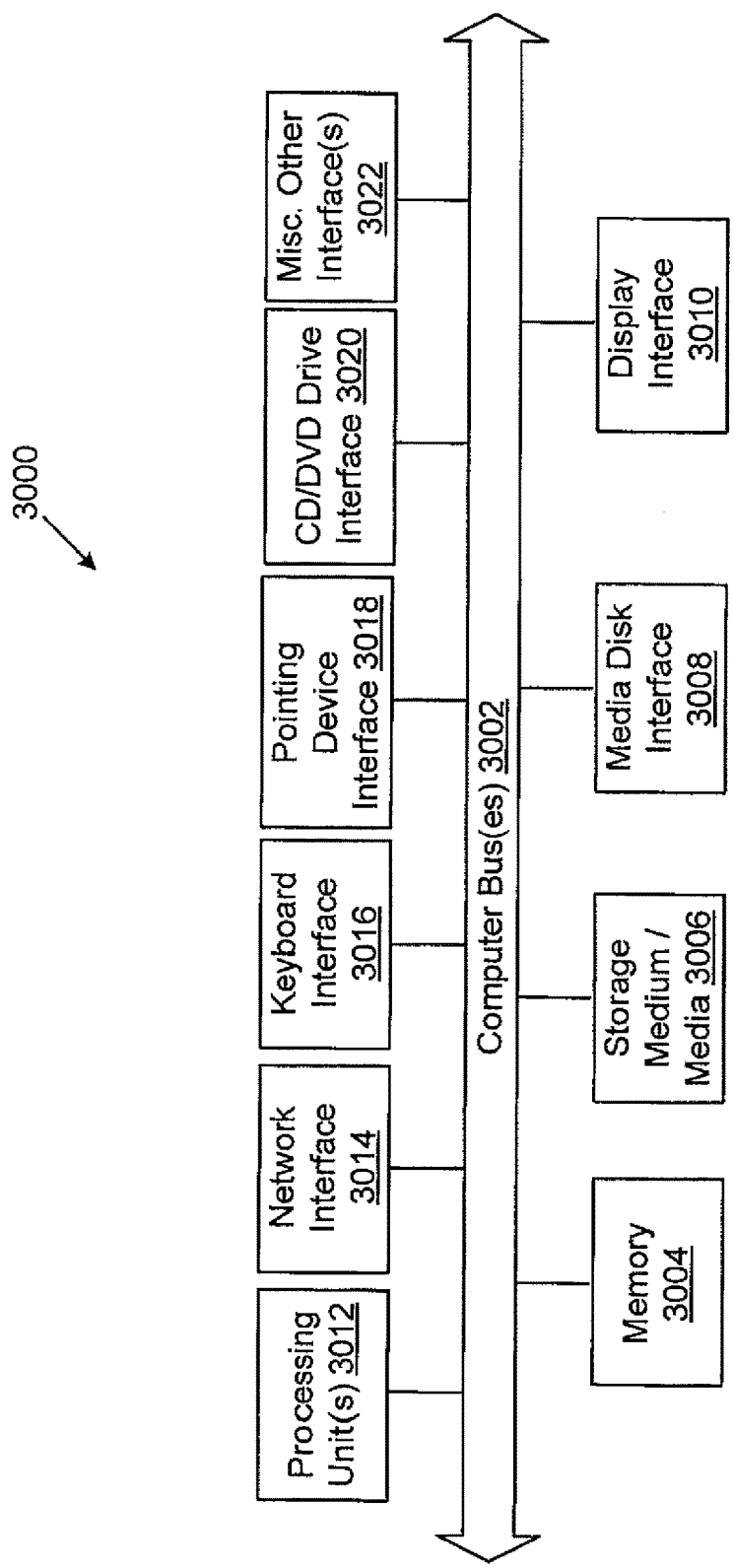
FIG. 30 is a block diagram illustrating an internal architecture of an example of a computing device, such as the server and/or computing device of FIG. 1, in accordance with an embodiment of the present disclosure.

FIG. 30 is a block diagram illustrating an internal architecture of an example of a computing device, such as server 110 and/or computing device 105, in accordance with one or more embodiments of the present disclosure. As shown in FIG. 30, internal architecture 3000 includes one or more processing units (also referred to herein as CPUs) 3012, which interface with at least one computer bus 3002. Also interfacing with computer bus 3002 are persistent storage medium/media 3006, network interface 3014, memory 3004, e.g., random access memory (RAM), run-time transient memory, read only memory (ROM), etc., media disk drive interface 3008 as an interface for a drive that can read and/or write to media including removable media such as floppy, CD-ROM, DVD, etc. media, display interface 3010 as interface for a monitor or other display device, keyboard interface 3016 as interface for a keyboard, pointing device interface 3018 as an interface for a mouse or other pointing device, and miscellaneous other interfaces not shown individually, such as parallel and serial port interfaces, a universal serial bus (USB) interface, and the like.

Memory 3004 interfaces with computer bus 3002 so as to provide information stored in memory 3004 to CPU 3012 during execution of software programs such as an operating system, application programs, device drivers, and software modules that comprise program code, and/or computer-executable process steps, incorporating functionality described herein, e.g., one or more of process flows described herein. CPU 3012 first loads computer-executable process steps from storage, e.g., memory 3004, storage medium/media 3006, removable media drive, and/or other storage device. CPU 3012 can then execute the stored process steps in order to execute the loaded computer-executable process steps. Stored data, e.g., data stored by a storage device, can be accessed by CPU 3012 during the execution of computer-executable process steps.

Persistent storage medium/media 3006 is a computer readable storage medium(s) that can be used to store software and data, e.g., an operating system and one or more application programs. Persistent storage medium/media 3006 can also be used to store device drivers, such as one or more of a digital camera driver, monitor driver, printer driver, scanner driver, or other device drivers, web pages, content files, playlists and other files. Persistent storage medium/media 3006 can further include program modules and data files used to implement one or more embodiments of the present disclosure. Persistent storage medium/media 3006 can be either remote storage or local storage in communication with the computing device.

For the purposes of this disclosure a computer readable storage medium stores computer data, which data can include computer program code executable by a computer, in machine readable form. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Those skilled in the art will recognize that the methods and systems of the present disclosure may be implemented in many mariners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
   detecting, by a client-side module, a web page loaded by a browser that includes the client-side module;
   transmitting, by the client-side module, a URL to a server computer over a network after the web page has loaded;
   receiving, at the computing device, a set of topics associated with the web page and categories from the server computer, the categories identifying subject areas in which the topics are categorized;
   selecting, by the client-side module, a renderer for displaying the topics, the selecting comprising:
      selecting a generic renderer upon determining that the categories include at least one generic category, the generic renderer configured to retrieve data from at least one third-party data sources based on the topics, and selecting a category-specific renderer upon determining that the categories do not include a generic category, the category-specific renderer configured to display a plurality of entities associated with the topics;

configuring, by the computing device, a second content area of the browser according to a category in the categories, the configuring of the second content area comprising selecting a category-specific renderer; and displaying, on the display by the browser, and under the control of the client-side module using the renderer, in the second content area, topics from the received set of topics associated with the web page.

2. The method of claim 1 further comprising receiving the client-side module from the server computer over the network.

3. The method of claim 1 wherein the transmitting step further comprises transmitting a Uniform Resource Locator (URL) of the web page to the server computer.

4. The method of claim 1 wherein the transmitting step further comprises transmitting a copy of the content of the web page to the server computer.

5. The method of claim 1 further comprising:

receiving, by the client-side module, a selection of one of the received topics from a user;

transmitting, by the client-side module to the server computer, the selected topic; and receiving, by the client-side module from the server computer, additional information associated with the selected topic.

6. The method of claim 1 wherein the receiving of a set of topics associated with the web page further comprises receiving an item associated with the set of topics.

7. The method of claim 6 further comprising displaying, by the display, the received item within the second content area.

8. The method of claim 1 further comprising receiving, by the client-side module, advertiser content associated with a topic in the received set of topics.

9. A non-transitory computer readable storage medium storing computer program instructions capable of being executed by a computer processor on a computing device, the computer program instructions defining the steps of:

detecting, by a client-side module, a web page loaded by a browser that includes the client-side module;

transmitting, by the client-side module, a URL to a server computer over a network after the web page has loaded;

receiving, at the computing device, a set of topics associated with the web page and a set of categories from the server computer, the categories identifying subject areas in which the topics are categorized;

selecting, by the client-side module, a renderer for displaying the topics, the selecting comprising:

selecting a generic renderer upon determining that the categories include at least one generic category, the generic renderer configured to retrieve data from at least one third-party data sources based on the topics, and selecting a category-specific renderer upon determining that the categories do not include a generic category, the category-specific renderer configured to display a plurality of entities associated with the topics;

configuring, by the computing device, a second content area of the browser according to a category in the set of categories, the configuring of the second content area comprising selecting a category-specific renderer; and displaying, by the browser in the second content area using the renderer, the received set of topics associated with the web page.

10. The computer readable storage medium of claim 9 wherein the step of transmitting a request to the server computer for topics associated with a search query input into a web page further comprises transmitting a URL of the web page to the server computer.

* * * * *